(12) United States Patent
Keel

(10) Patent No.: US 9,185,147 B1
(45) Date of Patent: Nov. 10, 2015

(54) SYSTEM AND METHODS FOR REMOTE COLLABORATIVE INTELLIGENCE ANALYSIS

(76) Inventor: Paul Erich Keel, Cambridge, MA (US)

(*) Notice: Subject to any disclaimer, the term of this patent is extended or adjusted under 35 U.S.C. 154(b) by 1215 days.

(21) Appl. No.: 12/916,693

(22) Filed: Nov. 1, 2010

Related U.S. Application Data

(63) Continuation-in-part of application No. 12/563,416, filed on Sep. 21, 2009, now Pat. No. 8,499,248, and a continuation-in-part of application No. 11/118,301, filed on Apr. 29, 2005, now Pat. No. 7,640,511.

(60) Provisional application No. 61/116,747, filed on Nov. 21, 2008, provisional application No. 60/566,723, filed on Apr. 29, 2004, provisional application No. 61/351,112, filed on Jun. 3, 2010, provisional application No. 61/262,827, filed on Nov. 19, 2009.

(51) Int. Cl.
- *G06F 3/00* (2006.01)
- *G06F 3/048* (2013.01)
- *H04L 29/06* (2006.01)
- *G06F 3/16* (2006.01)

(52) U.S. Cl.
CPC .................................... *H04L 65/403* (2013.01)

(58) Field of Classification Search
CPC .............................. H04L 65/403; H04L 51/04
See application file for complete search history.

(56) References Cited

U.S. PATENT DOCUMENTS

| | | | | |
|---|---|---|---|---|
| 5,261,044 A * | 11/1993 | Dev et al. | | 715/855 |
| 7,068,385 B2 * | 6/2006 | Kohli | | 358/1.15 |
| 7,343,567 B2 * | 3/2008 | Mann et al. | | 715/826 |
| 7,925,984 B2 * | 4/2011 | Awe et al. | | 715/762 |
| 7,930,624 B2 * | 4/2011 | Phillips et al. | | 715/201 |
| 8,417,827 B2 * | 4/2013 | Anttila et al. | | 709/231 |
| 2002/0129052 A1 * | 9/2002 | Glazer et al. | | 707/501.1 |
| 2003/0058283 A1 * | 3/2003 | Larsen | | 345/810 |
| 2003/0126211 A1 * | 7/2003 | Anttila et al. | | 709/205 |
| 2003/0163459 A1 * | 8/2003 | Shem-Ur | | 707/3 |
| 2003/0225832 A1 * | 12/2003 | Ludwig | | 709/204 |
| 2004/0212640 A1 * | 10/2004 | Mann et al. | | 345/792 |
| 2006/0294571 A1 * | 12/2006 | Moore et al. | | 725/135 |
| 2009/0100372 A1 * | 4/2009 | Lauridsen et al. | | 715/781 |
| 2009/0249223 A1 * | 10/2009 | Barsook et al. | | 715/753 |
| 2010/0318921 A1 * | 12/2010 | Trachtenberg et al. | | 715/751 |
| 2011/0119598 A1 * | 5/2011 | Traylor et al. | | 715/753 |

* cited by examiner

*Primary Examiner* — Yongjia Pan
(74) *Attorney, Agent, or Firm* — Chapin IP Law, LLC

(57) ABSTRACT

A system provides collaboration and exchange of information among a group of users based on creation, sharing and exchange of multimedia objects. The system further provides techniques to share the multimedia objects in the form of cards among analysts. A graphical user interface providing a number of views through which multimedia objects can be viewed and manipulated is also disclosed.

20 Claims, 30 Drawing Sheets

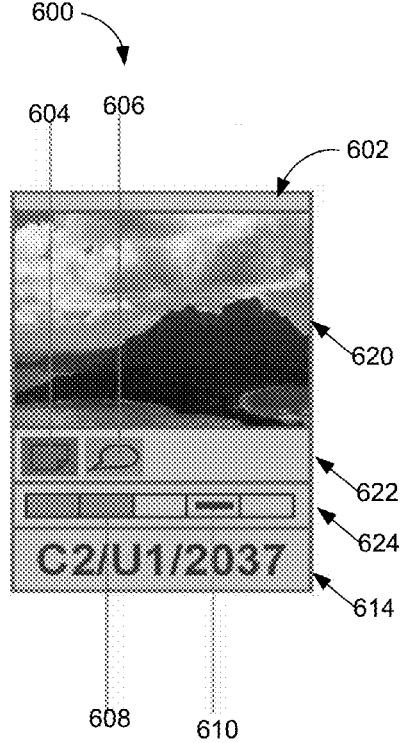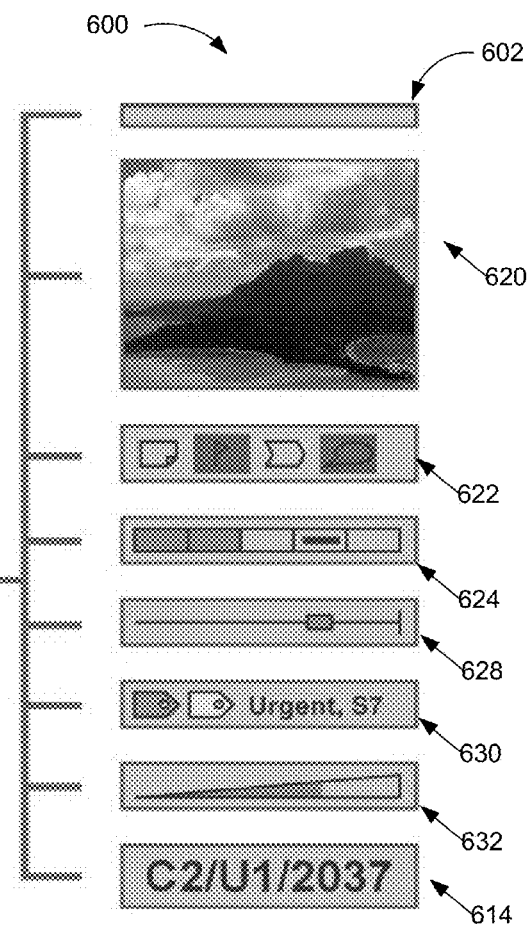
FIG. 4A
FIG. 4B

SYSTEM AND METHODS FOR REMOTE COLLABORATIVE INTELLIGENCE ANALYSIS

CROSS REFERENCE TO RELATED APPLICATIONS

This application is a continuation-in-part of earlier filed U.S. patent application Ser. No. 12/563,416, filed Sep. 21, 2009 now U.S. Pat. No. 8,499,248 entitled "METHODS AND APPARATUS FOR MANAGING AND EXCHANGING INFORMATION USING INFORMATION OBJECTS" which claims the benefit of earlier filed U.S. Provisional Patent Application having Ser. No. 61/116,747 entitled "INFORMATION OBJECTS (IOS) AND INFORMATION VIEWS (IVS)," filed Nov. 21, 2008 that shares co-inventorship with the present application and is a continuation in part of earlier filed U.S. patent application Ser. No. 11/118,301, filed Apr. 29, 2005, now U.S. Pat. No. 7,640,511 entitled "METHODS AND APPARATUS FOR MANAGING AND INFERRING RELATIONSHIPS FROM INFORMATION" which claims the benefit of the filing date of earlier filed U.S. Provisional Patent Application having Ser. No. 60/566,723 entitled "METHODS AND APPARATUS FOR MANAGING AND INFERRING RELATIONSHIPS FROM INFORMATION", filed Apr. 29, 2004. This application claims the benefit of the filing date of: of earlier filed U.S. Provisional Patent Application having Ser. No. 61/351,112 entitled "SOFTWARE SYSTEM FOR REMOTE COLLABORATIVE INTELLIGENCE ANALYSIS," filed Jun. 3, 2010 that shares inventorship with the present application and earlier filed U.S. Provisional Patent Application having Ser. No. 61/262,827 entitled "INFORMATION CONTAINERS," filed Nov. 19, 2009. This application claims the benefit of the filing date of: of earlier filed U.S. patent application having Ser. No. 12/793,207 entitled "METHODS AND APPARATUS FOR MANAGING INFORMATION OBJECTS IN AN ELECTRONIC PERSONAL INFORMATION MANAGEMENT SYSTEM," filed Jun. 3, 2010. The entire teachings and contents of these Patent Applications are hereby incorporated by reference herein in their entirety.

STATEMENT REGARDING FEDERALLY SPONSORED RESEARCH

This invention was made with government support under government Grant No. N00014-02-1-0132 and/or N00014-04-1-0569 and/or N00014-08-C-0206. The Government has certain rights in this invention

BACKGROUND

Modern information processing systems allow users to collect and process large amounts of information. As an example, a typical computer system such as a personal computer includes an operating system that executes within the computer system to provide a graphical user interface to users of that computer system. A conventional graphical user interface typically includes a number of information objects such as graphical icons that represent information of relevance or importance to the user. The user accesses data and controls functionality of the computer system by selecting and operating such icons. By way of example, software applications such as word processors, graphical editing tools, web browsers and many others often provide graphical user interfaces that include a number of icons that have visual meaning to the user of the computer system. Typically, a software application renders icons to allow the user to invoke specific functionality or commands of that application and/or to allow the user to organize and access data. Many software applications use icons to represent data or files that the user can access by selecting (e.g., clicking) the icon representing the data. As an example, if a user selects an icon that represents a software application installed within the computer, the computer will begin execution of that application. Other icons on a graphical user interface can represent folders or files maintained by the operating system within a file system.

Many conventional software applications allow a user to develop or collect various portions of information or content for storage and future access. As an example, a word processor or other editing tool allows the user to create and edit documents. As another example, a web browser allows a user to navigate web pages provided by servers on remote computer networks such as the Internet to reference information on a variety of subjects. A conventional computer system allows a user to store information referenced or created by such applications as a set of documents or files that can be retrieved by the user at a later time.

Most conventional operating systems and many software applications also provide a way for a user to arrange a file system of the computer in order to organize documents and files in a manner that makes sense to the user. Computer operating systems typically organize file systems in a hierarchical manner allowing the user to create folders or directories with user-specified names. The user can store files within the folders in a manner that makes sense to that user. A file system is thus one of the most popular ways for users to organize and manage data and information of interest to those users.

Another mechanism that conventional applications and operating systems provide to allow users to organize and manage information of interest to that user is the ability to allow a user to spatially arrange information objects such as graphical icons in a way that makes intuitive sense to the user. As an example, on a conventional "desktop" work area provided by many operating systems, a user can place or position icons representing files, documents, applications, email messages, appointments or the like in any manner and at any position that the user may choose. In particular, such conventional applications allow the user to graphically maneuver the icons into position in relation to one another in a manner that makes sense to that user. Different users often organize icons on their desktop in different ways. Information availability and accessibility is continuously increasing. The problem is that information commonly exists in different formats, resides in different locations, is dynamically changing, and is used and modified by different people. This makes it difficult for users to effectively monitor, analyze and exchange information.

One of the more recent intelligence challenges is the evaluation of video feeds generated by a rapidly increasing number of unmanned (aerial or land) vehicles (UAVs, ULVs, etc.) and security cameras. On Jan. 10 2010 the New York Times featured an article entitled "Military is Awash in Data from Drones." The article states that "As the military rushes to place more spy drones over Afghanistan, the remote-controlled planes are producing so much video intelligence that analysts are finding it more and more difficult to keep up. Air Force drones collected nearly three times as much video over Afghanistan and Iraq last year as in 2007—about 24 years' worth if watched continuously. That volume is expected to multiply in the coming years as drones are added to the fleet and as some start using multiple cameras to shoot in many directions."

SUMMARY

Conventional mechanisms and techniques that allow a user (also referred to as a participant, operator or analyst) to visually organize, collect and manage information objects that represent various portions of information suffer from a variety of deficiencies. In particular, conventional computer-based applications such as operating system desktops and software application graphical user interfaces allow a user to collect and store numerous portions of content and information that are of interest to the user and allow a user to represent that information graphically (e.g. via icons), but do little to analyze relations that may exist between the icons and/or between the stored portions of content or data. In particular, conventional information processing systems such as those noted above allow a user to organize and arrange various portions of data or other information as icons in a graphical user interface in a manner that makes sense to the user, but such systems do not promote conversations and collaboration among users.

Another deficiency with conventional information processing systems is that information is represented in different formats and, depending on the format, is stored in different locations. For example, conventional browsers store hyperlinks to web sites as bookmarks, whereas emails are located in mailboxes in mail handlers, files are stored in computer directories, and notes may be stored in files, and so forth. The proposed information object mechanism, disclosed herein, solves this deficiency by introducing a standardized information format that represents a piece of information in an abstract way and links to an original piece of information and that has a standardized look thus allowing users to focus on and compare the information content and context rather that be distracted by the information format and location.

As an example of problems with conventional data processing systems, a user using a conventional content development application may spend large amounts of time collecting portions of content such as graphics, video clips, text, news stories, web pages, email messages, or other such information sources for collaborative production of a large content-based research project. Many users may be involved in this process. As each user collects portions of information using conventional information management systems, the users store and organize their respective portions of information within the computer file system. Each user may create icons on his or her desktop or other work areas that represent the respective portions of collected information. Each user might group icons representing related pieces of information together in a list, within close proximity to each other or in file directories to analyze, present, discuss or explain a particular set of information. In conventional systems however, it is up to the user to identify what other portions of information might be of interest to the user that the user has not already identified and collected.

As an example, if the collaborative production being developed by the users is a project related to current events, each user may collect articles and stories related to that current event. Using conventional systems, it is up to each user to research and discover stories or other content related to that current event that might be available from a variety of different information sources. While conventional collaboration systems might provide a common repository for such collected information contributed by each user, there is little or no ordering to this information, other than an order specified by the users who place the content into the shared repository such as a file system or database. Each user must frequently communicate with other users in a highly manual manner (e.g. via a telephone call, email or other mechanism) to identify content that other users may have discovered and collected that might be of relevance to the production under development.

Such conventional information management systems do not automatically and dynamically analyze relations between user placed icons that represent the various pieces of available information in order to assist users in identifying other portions of content that many of interest to those users. More specifically, conventional systems do not analyze specific spatial relations, collaborative context relations, chronological context relations, and the like between information sources associated with icons arranged by a user to determine other portions of information, such as other portions of content collected by other users, that may be of relevance or interest to the user providing a specific spatial arrangement of his or her icons. As a result, conventional information management systems limit a user's knowledge of other available content and information to which that user may have interest. In particular, such systems limit available content to that content that a user can discover on their own.

As an example, using a conventional information discovery processes such as web searching, a user can quickly become overwhelmed with search results that are irrelevant to the information they are seeking. While some conventional web sites may attempt to suggest references to web pages that are similar in nature to those discovered when providing a particular search term, such additional references are simply provided based on frequently performed searches of other users and do not take into account current information already collected by the user performing the original search. Thus a conventional browser is not made aware that a user already has collected certain related pieces of information and has organized them in a spatially related manner.

In contrast, embodiments of the invention are based in part on the observations that conventional information collection management systems provide a significant cognitive burden on users caused by the increasing availability of information, the requirement for users to actively initiate a search for relevant information, the requirement for evaluation of the quality and feasibility of information, the need to collaborate remotely and asynchronously, as well as the necessity to dynamically adapt to changing circumstances. Modern information processing systems do not provide an automated ability to organize and identify information sources that come in many different formats. For example, information may be received in the form of a phone call, an email, an instant message, a computer file, a web site, a database item, a verbal comment, a radio transmission, a newspaper, a television spot, a magazine, or a security camera. The various formats often prevent the easy and efficient collection, organization, and comparison of information by conventional information processing systems. Embodiments of the invention incorporate advanced graphical user interfaces and functions to address the shortcomings in conventional systems. These embodiments include Information Objects (IOs) and Information Views (IVs). IOs that are data files that can include other data files (such as documents, hyperlinks, and executables) as well as meta-data (such as ratings, discussion logs, and visualization parameters). IVs are computer windows for the visualization of IOs. IOs are rendered differently on different IVs allowing users to manage information in a customized format and in environments suited to particular tasks and circumstances. In certain embodiments the IO consolidates data, meta-data and communication features. For example, the IO can be an agenda item, a discussion, a hosted conversation, a topic, etc. Accordingly, the user can efficiently view and organize multiple IOs that represent different topics and that engage different groups of participants. Advantageously IOs provide a means for users to package and visualize (static and dynamic) information in a standardized format. IOs can be viewed and modified differently on different IVs. IOs can be copied between the IVs of the same or different users. Copies of IOs remain synchronized if displayed on different IVs. IOs are associated with functions that enhance the collaborative use of information, for example, an object-based communication system that allows users to communicate through IOs and IVs.

Other benefits of Information Objects and Views include the ability to: consolidate task relevant information (e.g. from shared IVs to private IVs); display information in a custom and familiar format (e.g., in a wide variety of possible custom IVs); maintain a standardized data format for different data visualization and management tools; easily move data between different data visualization and management tools; and easily exchange information among remotely distributed participants in a hosted conversation.

Using techniques disclosed herein, it is possible to create IOs transfer IOs between the same or different types of IVs, add additional IVs and additional functions for IOs, as well as a selection of IO components, IO functions on IVs. A graphical user interface is provided for the management of multiple IVs, as well as new functions for the exchange of IOs, the collaborative use of IVs and the creation of multimedia IOs.

Embodiments of the invention as disclosed herein provide mechanisms and techniques for providing segments of multimedia data as the information object, displaying the information object in one of a plurality of views selected from a view manager panel, exchanging the information object among a plurality of participants and in response to interaction with the information object in one of the plurality of views by one of the participants, providing a communications path between at least two of the plurality of participants sharing the information object.

The technique further includes displaying the information object in one of a plurality of views further comprises displaying the information object as a multi-functional card in one of the plurality of views and structuring the multi-functional card hierarchically by spatially locating at least one second smaller card inside the multi-functional card. Another technique includes forming a group from the plurality of participants where any participant can share the information object with an additional participant thereby including the additional participant within the group.

An exemplary system disclosed herein provides a computational environment for the support of individual and collaborative decision-making and greatly enhances the quality and the speed of individual and collaborative brainstorming, problem-solving, information collecting and decision-making processes. More specifically, an exemplary system for sharing information objects among a group of participants includes a processor, a memory unit that stores instructions associated with an application executed by the processor and an interconnect coupling the processor and the memory unit, enabling the computer system to execute the application and perform operations of: providing segments of multimedia data as the information object, displaying the information object in one of a plurality of views, exchanging the information object among a plurality of participants and in response to interaction with the information object in one of the plurality of views by one of the participants providing a communications path between at least two of the plurality of participants sharing the information object.

The system further provides a graphical user interface for displaying an information object which includes a Participants panel for displaying a list of participants linked to the information object and for exchanging the information object among the list of participants and a Multimedia panel for displaying segments of multimedia data as the information object.

In one configuration, the IOs are sometimes represented as "cards" on a graphical user interface. IOs reference different types of information formats thus making it easier for users to directly compare and study information in different formats. As used herein the term "object," "IO" and "information object" are used interchangeably, and a card is one example configuration or representation of an information object. In another configuration, a system performs operations of: providing segments of multimedia data as the information object; displaying the information object in one of a plurality of views selected from a view manager panel and exchanging the information object among a plurality of participants. The system in response to interaction with the information object in one of the plurality of views by one of the participants performs the operation of providing a communications path between at least two of the plurality of participants sharing the information object. The design of certain embodiments includes a series of additions for picture and video processing that offer potential applications in both military and commercial environments. The design is explained below through various examples that demonstrate the use of the proposed software additions within the context of remote collaborative intelligence analysis.

Embodiments of the invention include any type of computerized device, workstation, handheld, tablet or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include various graphical representations of the IOs themselves, for example as displayed on a graphical user interface as will be explained in more detail.

It is to be understood that the system of the invention can be embodied strictly as a software program, as software and hardware, or as hardware alone such as within a processor, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIGS. 4A and 4B are diagrams of multimedia Cards representations of (IOs) including customizable components in accordance with one example embodiment disclosed herein.

DETAILED DESCRIPTION

Figure 1:
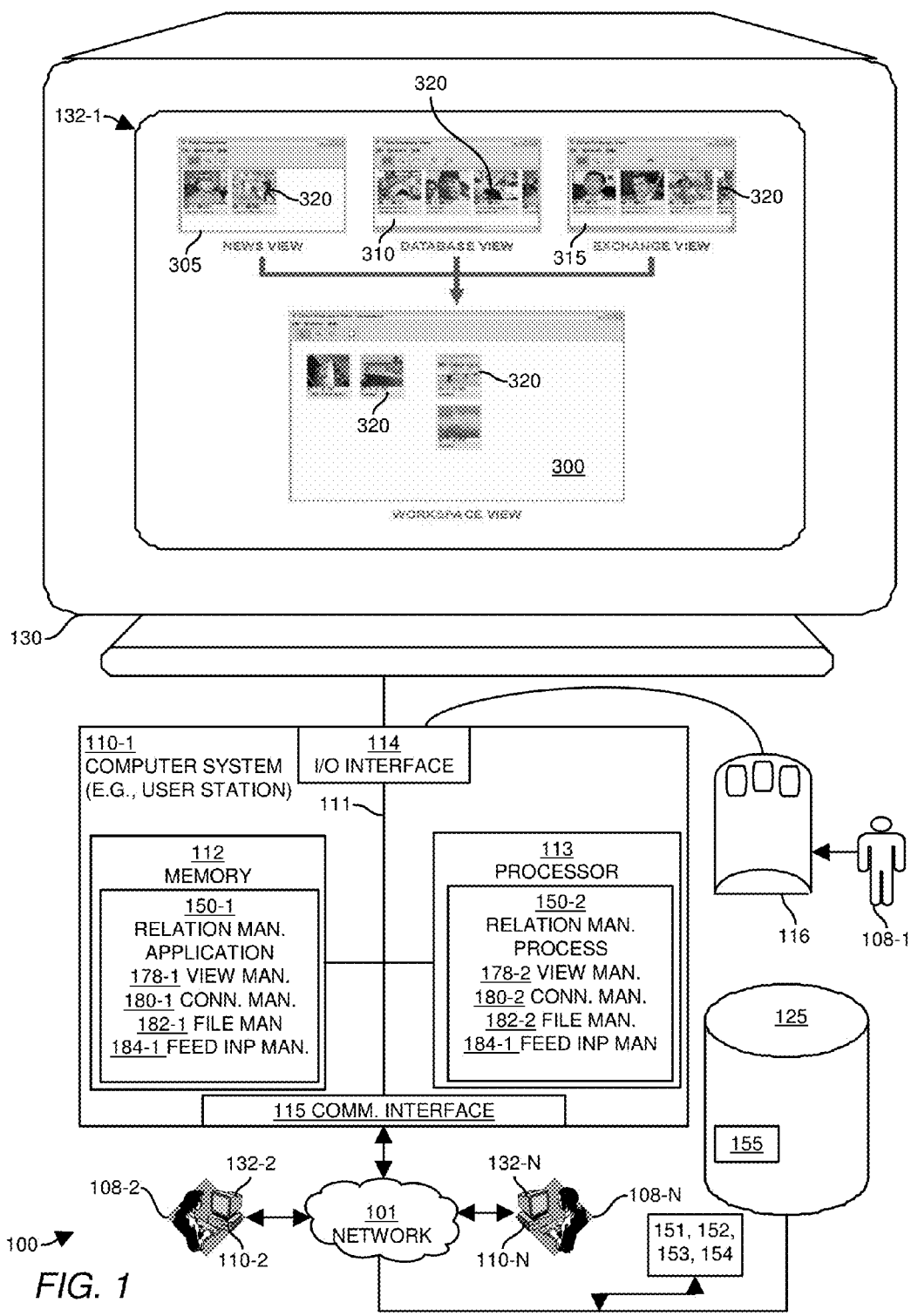
FIG. 1 is an example network environment including computer systems configured with a relation manager, a view manager, a connection manager, a file manager and a feed input manager in accordance with one example embodiment disclosed herein.

FIG. 1 illustrates the computer-networking environment 100 suitable for use in explaining example embodiments of invention. The computer-networking environment 100 includes a network 101 such as a local area network (e.g., LAN) that interconnects a plurality of computer systems 110-1 through 110-N that each execute respective relation managers 150 (application 150-1 and process 150-2), view manager managers 178 (application 178-1 and process 178-2), connections managers 180 (application 180-1, process 180-2) and IO file managers 182 (application 182-1 and process 182-2) and Feed Input managers 184 (application 184-1 and process 184-2) under respective control of a plurality of users 108 (also referred to a participants or analysts). The computer system 110 may be any type of computerized device such as a personal computer, laptop, workstation, mainframe terminal, or the like. In this example, each computer system 110 generally includes in interconnection mechanism 111 such as a data bus, motherboard or other circuitry that interconnects a memory 112, a processor 113, an input output interface 114 and a communications interface 115. A display 130 such as a computer monitor and input output mechanism 116 couple to the computer system 110 via the input output interface 114. The communications interface 115 allows communication with other computer systems 110-2 through 110-N over the network 101. The architecture of the computer system 110-1 is shown in FIG. 1 by way of example only. It is to be understood that the details of the example computer systems 110-2 through 110-N can be similar to those of computer system 110-1 but are not shown in FIG. 1 due to drawing space limitations.

The memory 112 within each computer system 110 may be any type of computer readable medium such as random access memory (RAM), read only memory (ROM). The memory 112 may be fixed or removable from the computer system 110, such as a floppy disk, magnetic disk, optical disk media (e.g., CD ROM) or the like. In one embodiment, the memory 112 is encoded with computer program logic (e.g., software code) that includes a relation manager application 150-1, a relation manager application 150-1, a view manager application 178-1, a connection manager application 180-1, a file manager application 182-1 and a feed input manager application 184-1.

When the processor 113 executes the relation manager application 150-1, the processor 113 produces a relation manager process 150-2 that executes as explained herein to produce a graphical user interface 132-1 (the example being produced by the relation manager 150 in computer 110-1) on the display 130 for viewing by the user 108. The relation manager process 150-1 and application 150-2 are collectively referred to herein as simply the relation manager 150. When referring to the relation manager 150, it can thus be a reference to the executing process 150-2, the application code 150-1, or both. Each relation manager 150 in combination with the view manager 178, connections manager 180, file manager 182 and the feed input manager 184 to process files and documents and produce a graphical user interface 132 that provides, to the user 108, visual knowledge representation, dynamically updated content, hosted conversations, and interpretation and management based in part on spatial relationships. To do so, the managers 150, 178, 180, 182 and 184 include a workspace server 151, a news server 152, an exchange server 153 and a database server 154 that each produce, respectively, a Workspace View 300 (also referred to as a Card View), a News View 305, a database view 310 and an exchange view 315 within the graphical user interface 132. The relation manager 150 adds discovered relations to IO's in a database 125 (the database 125 may already include relations that other people or software products added). The relation manager also provides the algorithms 155 to examine the network of relations to discover potentially relevant information. The database 125 maintains a history of updates to the IOs to allow for inclusive reconstruction of a particular IO at given time. In one embodiment, the authorship history of the information object is recorded and a history of the authorship is perpetuated in a duplicated information object. For example, if User A duplicates an object from User B then User A's objects will remember that it was originally created by User B.

The workspace server 151 produces the Workspace View 300 that in one configuration is a graphical user work area, such as a desktop, in which a user 108 is able to create and manipulate graphical information objects that graphically represent information objects of interest to user 108. The Workspace View 300 helps users 108 to create, collect, organize and understand information associated with each IO 320 and the relationships among information represented by the IO 320. In one configuration, a generic client application such as a web browser accesses such views from respective servers 151 through 154 that may execute on the same or different computer systems 110. In another alternative configuration, a dedicated client application includes or provides the Workspace View, the News View, the database view, and the exchange view and implements the news server, the database server, and the exchange server. It is to be understood that the system described herein may be distributed or centralized and may operate among many computer systems with many users 108.

Information Objects (IOs) (also referred to as objects) are flexible data structures and can include data files that can include other data files as well as meta-data (for the display of IO contents and the use of IO functions on different IVs), present themselves differently depending on the IV they are displayed on, include the same data and functionality on any IV they are displayed on. IOs can be copied or transferred between the same or different types of IVs, copied or transferred between the IVs of the same or different users, remain synchronized if copied to multiple IVs, synchronized with dynamic data sources other than source-IOs, moved from an IV to the computer desktop, file system, or third party applications, thus converting an IO into a regular computer file that can be exchanged through conventional means such as email or file sharing and can be moved from the computer desktop, file system or third party applications to any IV.

Information Views (IVs) (also referred to as Views) can include graphical user interfaces that render IOs in different ways (can be described as an optical lenses that allows users to view information in different ways) and can enable access to IO parameters and functions. Using system 110 a user can interact with an information object, the system 110 facilitates sharing the IO among a plurality of participants; provides controls for attaching multi-media data to the IO, displays the IO in one of a plurality of views; and in response to interaction with one of the plurality of views by one of the participants, provide a communications path between at least two of the participants sharing the IO.

Returning attention back to the graphical user interface 132 in FIG. 1, the Workspace View 300 presents users with an empty canvas for the creation and grouping of IOs 320. In one configuration, the Workspace View 300 can be the desktop of a computer system 110 provided by an operating system, such as the Windows Desktop provided by the Windows family of operating systems made by Microsoft Corporation of Redmond Wash., USA (Windows is a registered trademark of Microsoft Corporation). The Workspace View 300 is designed to support individual and collaborative sense-making tasks such as information analysis, planning, decision-making, brainstorming, and problem-solving. The Workspace View 300 functionality will provide users 108 with the means to efficiently create, collect, organize, analyze, and discuss information. In one configuration, IOs 320 may be created manually or semi-automatically. The manual creation of IOs 320 requires the user 108 to position an empty IO 320 on the Workspace View 300 and complement it with a picture, a heading, and a reference to an information source by simply dragging and dropping pictures, texts, hyperlinks, files, or file folders onto IOs 320. The semi-automatic creation of IOs 320 allows users to drag and drop pictures, text, hyperlinks, URLs, files, and file folders directly onto the Workspace View 300. This action will cause the workspace server 151 to create a new IO 320 with the content of the dropped item linked or attached to the IO 320 and with a picture and a heading added to an icon area and the heading bar (to be explained) of the IO 320. Users 108 may also copy IOs 320 from the News View 305, the database view 310 or the exchange view 315. Furthermore, a user 108 can copy IOs 320 from the Workspace View 300 to the computer desktop or file system (and vice versa) thus converting IOs 320 into regular computer files. This functionality has a variety of applications such as to exchange IOs 320 by email or to convert IOs 320 for use with other software applications. Automated IO creation is provided as well that allows a user for example to specify a file system or path or URL or database identity and the system can traverse records, documents, web pages, files and the like within the specified path, database or domain and can convert each record, file or page into an IO for use in the system.

In one embodiment the relation manager 150 allows a user to easily arrange, compare, and evaluate IOs 320 thus ensuring that users 108 will not be distracted by different information formats but focus on information contents. Each individual user 108 can determine the particular arrangement or spatial (vertical, horizontal, overlapping, proximal) layout of the graphical IOs on his or her Workspace View that might indicate meaning to that user 108. For example, a user 108 may group IOs that represent related information sources in a relatively close proximity to one another thus defining tight spatial relationships between those IOs.

The system is able to analyze spatial relationships that exist between IOs 320 in each user's Workspace View 300 in order to identify other information objects (e.g., other IOs 320) that may be of interest to that user 108. Based on this analysis, the relation manager 150 can identify other information sources by showing other IOs 320 that might be of interest to that user. Embodiments disclosed herein are based in part on the observation that the spatial arrangement of a first set of objects such as IOs 320 in the Workspace View 300 can be used to identify relationships between those objects and can be further used to identify other objects (such as other IOs) that may be of importance to a user who created the initial spatial relation between the first set of objects in the Workspace View 300.

The Workspace View 300 introduces several options for the grouping of IOs 320. One option is to increase the size of one IO 320 so as to accommodate several other IOs 320 inside its boundaries. Moving an IO 320 will drag along all IOs 320 within its boundaries. A second option is to overlap IOs 320. Moving an IO 320 inside a cluster of overlapping IOs 320 will drag along the entire cluster of IOs 320. A third option is to use multiple workspaces for the grouping of IOs 320. A fourth option is to link IOs 320 to an entire IO arrangement. A mouse-click onto such an IO 320 will then open another Workspace View 300 and display the IO arrangement. Further details on contents and layout of IOs 320 will be explained shortly.

The news server 152 produces (i.e. provides information feeds for) the News View 305 to allow users 108 to collect IOs 320 for addition to the Workspace View 300. IOs 320 in the News View 305 represent information from a variety of other information sources. Feed examples includes news, alerts, announcements, motion detections on security cameras, emails, IMs, SMSs, sensors, real time search results, and custom content. An analogy of the News View 305 is a "news stand" in which recent or periodic information is available. In one configuration, the News View 305 displays the contents IOs 320 from news servers 151 that may be distributed through the network 101 within one of more computer systems 110. IOs 320 in the News View 305 can be organized by time and information sources (e.g., by topic or content area) as well as by geographic locations associated with the information represented by each IO 320. Users 108 are able to copy IOs 320 between the Workspace View 300 and the News Views 305. IOs 320 copied from the News View 305 to the Workspace View 300 may be static and not change in content, or such IOs 320 may dynamically adapt to modifications in content so that as the information source associated with an IO 320 produces new information.

In one configuration, the system can display IOs in various arrangements within the News View 305. In particular, the News View 305 can display a timeline arrangement of IOs 320. The timeline arrangement provides a visualization that represents and organizes knowledge using a grid comprising of a timeline categorization for IOs on the horizontal axis and subject categorization on the vertical axis. In an alternative configuration, the new server 152 can display a map arrangement that provides a visualization that represents and organizes knowledge using a world-map or a floor plan comprising of geographical categorization for IOs. As an example, a News View can organize and arrange IOs in an ordered list or as a table with rows and columns of IOs organized horizontally by time and vertically by information sources. In such a configuration, new IOs for newly discovered information can be inserted on the left pushing existing IOs to the right. The time scale can be irregular and optimized to display the largest number of IOs possible. The rows of IOs in the News View can automatically expand and contract depending on the number of IOs to be shown in each row.

In this manner, the system disclosed herein provides a novel process for information retrieval and processing based on information collection support. In one example, the News View 305 displays incoming information in IOs 320 from selected information sources. The users 108 can copy relevant information from the News View 305 to the Workspace View 300 or can create new information directly in the Workspace View 300 by creating new IOs. The user(s) 108 can study, organize, and categorize the information on the Workspace View 300. In one configuration, if the Workspace View is connected to a server then content and established relations are made accessible to this server. The user can use two Workspace Views if he wishes to separate between information that is public and private. Other users 108 view the information on the news view 395, database view 310 or exchange view 315 and can also copy relevant information from the news view 395, database view 310 or exchange view 315 to their personal Workspace Views 300. The system can track and analyze this movement of information from source to destination and can use this IO usage and movement data based on user identifiers, locations of IOs, arrangements of IOs, contents of IOs, times of movement and copying, and other such information in processing algorithms to infer or identify relationships between IOs and to suggest other IOs that reference other information that may be of interest to a user.

The News View 305 provides users 108 with the technology to effectively monitor and visualize additions and modifications from information sources such as web sites, databases, security cameras, alarm systems, sensors, news feeds and so forth. Information items are displayed individually as an IO 320. In one configuration, the News View 305 can organize and arrange IOs 320 in an ordered list or as a table with rows and columns of IOs 320 organized horizontally by time and vertically by information sources, such as by geographic origination or relation of the new story associated with the IO 320. In another configuration, the News View has several visualization options such as displaying the IO arrangement in a table or displaying the IO arrangement on a geographic map. In one configuration, new IOs 320 for newly discovered information can be inserted on the left in an appropriate row pushing existing IOs 320 to the right. The time scale can be irregular and optimized to display the largest number of IOs 320 possible. The rows of IOs 320 in the News View 305 can automatically expand and contract depending on the number of IOs 320 to be shown. The News View 305 can include an adaptor for receiving news feeds and the user interface chronologically organizes information chronologically in a subject-time matrix. The News View 305 row can combine multiple data streams so that a row includes a group of data streams. A News View row can also display other data formats as well (email, search results, sensor data gathered though a file transfer protocol (FTP) in addition to displaying RSS streams.

The News View 305 offers a variety of tools for the exploration and collaborative use of information. As an example, a user 108 can copy IOs 320 from the News View 305 to the Workspace View 300 thus allowing users to easily collect, compare and organize new information. IOs 320 copied from the News View 305 to the Workspace View 300 may be static or dynamic as noted above. A static IO 320 is an exact copy of the IO on the News View 305. In one configuration, a dynamic IO 320 continuously updates itself to reflect the most recent (left-most) IO on the News View row it was copied from. Additional exemplary layouts and IO features are described below in conjunction with the figures.

In this manner, the system disclosed herein provides a novel process for exchanging information and for asynchronous, decentralized, remote, and cross-organizational collaboration. In particular, users 108 use their individual Workspace Views 300 to organize and analyze information. The exchange view 315 displays (in prioritized order in one configuration) the IOs 320 created by collaborating users 108 (or those with the appropriate access permissions or security levels). The users 108 can copy relevant IOs 320 from their exchange views 315 to their Workspace Views 300. Users 108 can take "ownership" over IOs 320 copied from their exchange views 315 and these IOs 320 are now modifiable by the user 108. In one configuration, when a user takes ownership of an IO 320, the IO 320 is no longer synchronized with a counterpart IO on the IO author's Workspace View. In another configuration, once an IO 320 is owned exclusively by a user 108, IO 320 can no longer be used for collaboration such as by "instant messaging," IO commenting, or "IO voting."

Figure 2:
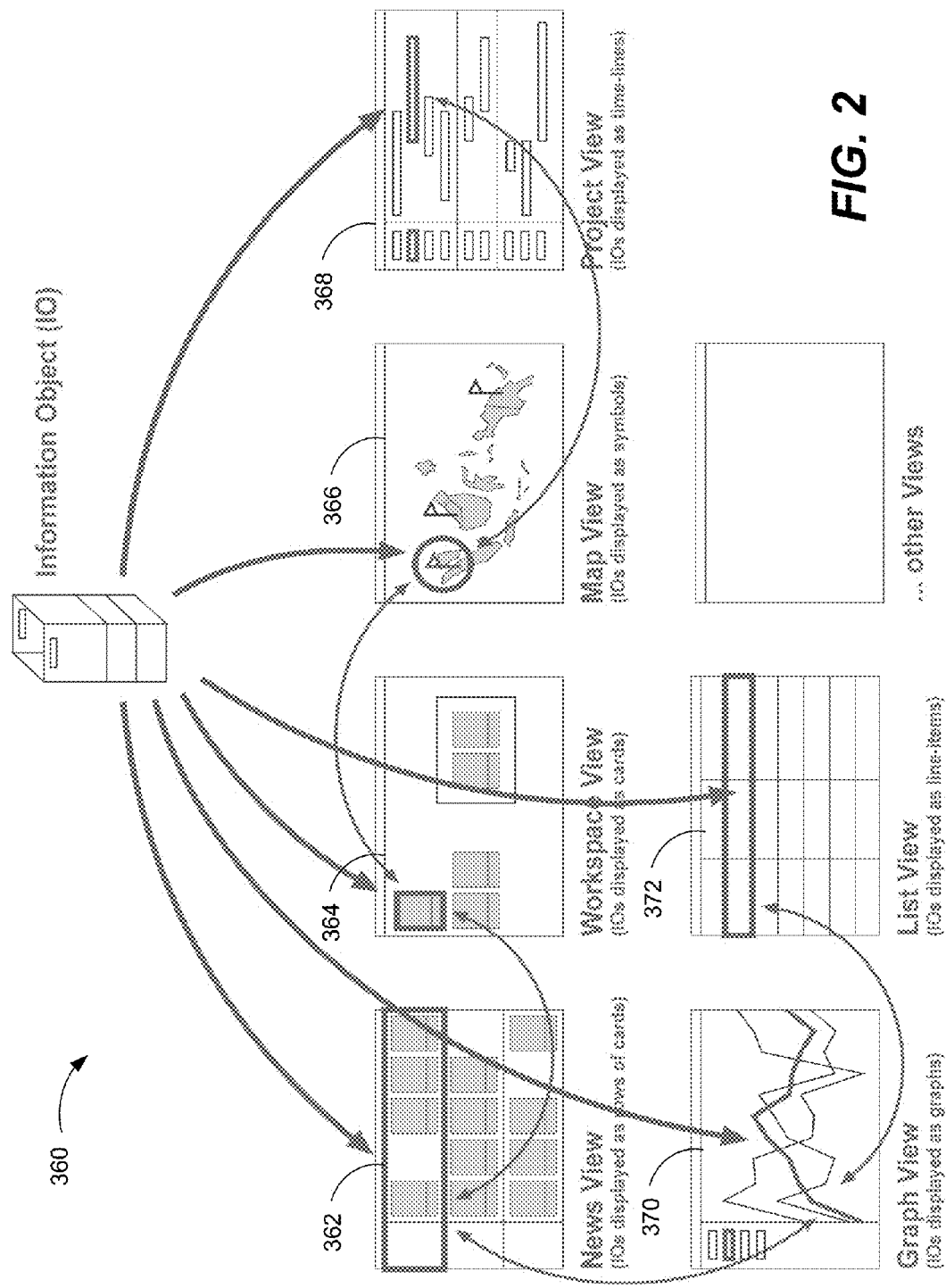
FIG. 2 is a diagram of information flow and IOs present themselves differently on different IVs and can be copied between IVs in accordance with one example embodiment disclosed herein.

FIG. 2 shows a diagram 360 of an IO 320 as viewed in several IVs. The diagram 360 also shows how IOs present themselves differently on different IVs and can be copied between IVs. The following are examples of the various IVs (not intended to be limiting). The News View 362 displays the contents of RSS streams (and other dynamic information sources) as IOs arranged in a table, organized by time in horizontal and by information sources, subject or category in vertical direction. New IOs are inserted on the left pushing existing IOs to the right. The time scale is irregular and optimized to display the largest number of IOs possible (meaning time segments without IOs are automatically removed). The rows automatically expand and contract depending on the number of news items (makes rows display similar numbers of IOs). Users can add RSS files by simply dropping an IO or an RSS URL onto a row in News View. A News View row can include multiple RSS streams (multiple streams are automatically combined). The News View can be used to display a wide variety of information such as newspaper news, emails instant messages, motion activity on web cameras, eBay and Craigslist postings, company internal announcements and alerts. The News View can also be used as a RSS feed generator. For example, a user could create an empty News View that users can view and add IOs to. Users can copy News View rows or individual IOs to other IVs. A copy of a News View row onto a Workspace View would result in a single IO that dynamically updates itself and that displays the most recent item in the associated RSS feeds. One purpose of the News View is to help users monitor large numbers of RSS feeds in a quick and easy comprehensible format.

The Workspace View 364 displays IOs in a game-card IO like format. The visual components of the IOs are customizable and expandable. Users can modify IO parameters in a so-called IO editor. For example, users can add files to IOs, view and modify ratings, or discuss the IO contents with other users through the built-in instant messaging system or shared white board. If a user moves a regular file or a URL from a computer file system or a web browser onto the Workspace View then an IO is automatically created with the file attached or the URL hyperlinked. The Workspace View is designed to allow users to easily collect, organize and compare information in different formats and locations. For example, a Workspace View may be used for web shopping allowing users to quickly drag and drop items of interest from different web sites (such as CNN, YouTube, Amazon, eBay, and Craigslist) onto the Workspace View for the subsequent comparison of options and prices. Since IO components can be dynamic (meaning that they can automatically retrieve content updates from dynamic information sources) the user can also use a collection of IOs to monitor changes to prices and bids.

The Map View 366 is a geographic map display that represents IOs as location items. A location item presents itself as (one or more) symbols (of choice) on the map. The location item allows access to IO functionality available in other IVs. If the geographic location associated with a location item is dynamic then the symbol would automatically update its location on the map. If a location item is copied to a Workspace View then it will present itself as an IO with the geographic location accessible and modifiable through the IO Editor. The Map View is primarily designed for military use but has a wide range of commercial applications as well. For example, a user could create a public Map View with hiking paths. Other users could copy hiking paths of interest from this public Map View to their personal Map View s or other IVs, discuss hiking paths through the IO instant messaging feature, or rate the quality of hiking paths through the IO rating system.

The Project View 368 is a time planning and calendar display (similar to MS Project) that allows users to represent IOs as time bars. IOs in this IV also maintain the contents and functionalities of IOs displayed on other IVs. Moving an IO from the Project View to the Workspace View would create an IO that displays the time frame with a time bar on the IO or a time frame in the calendar tool of the IO Editor. The Project View is primarily designed for people that need to compare and modify time related IO parameters. For example, the Project View may be used to review and modify IOs that represent tasks scheduled for execution during particular time frames, resources that are only available during particular time frames or people that are only available during particular time frames.

The Graph View 370 displays IOs as line or bar graphs. This particular IV is primarily designed for comparing statistical data associated with IOs such as stock quotes, bids and sensor data.

The List View 372 is a spreadsheet like display (similar to the Microsoft® Office Excel spreadsheet program) that allows users to represent IO parameters in a table format. The List View is primarily designed for people that need to compare and modify particular IO parameters such as, for example, the cost of sales items or the specifications of resources referenced by individual IOs.

Figure 3A:
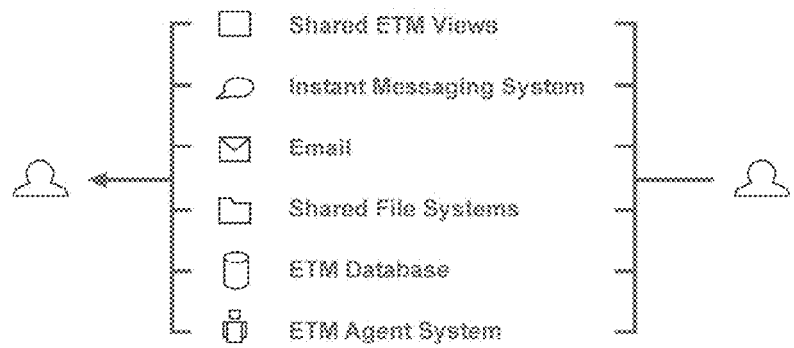
FIG. 3A is a diagram of IOs being exchanged between IVs of different users.
Figure 3B:
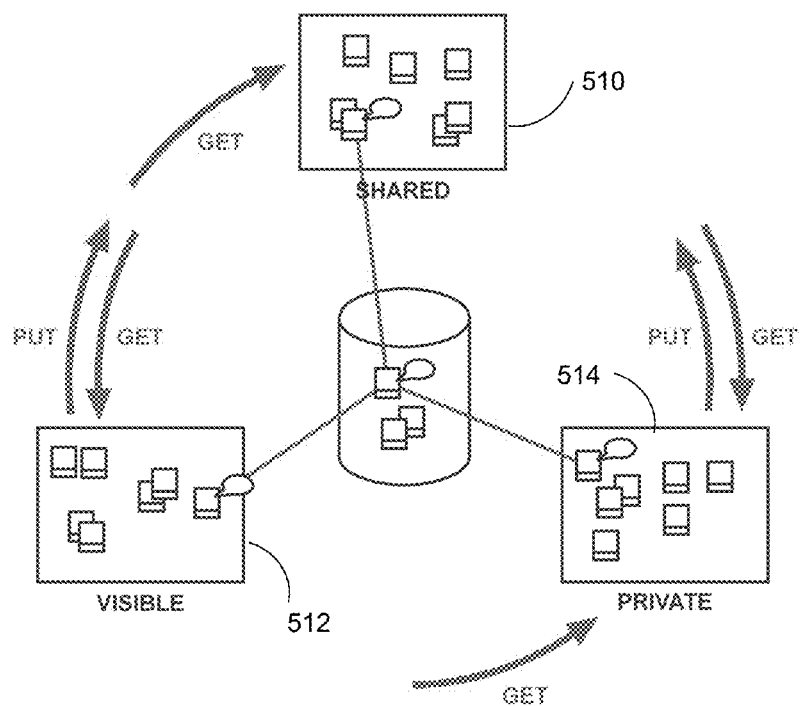
FIG. 3B is a diagram of IOs being exchanged between Private, Visible (Public) and Shared Views.

FIG. 3A shows a diagram of IOs being exchanged between IVs of different users. FIG. 3B shows a diagram of IOs being exchanged between Private, Visible and Shared Views. There are various ways in which IOs can be exchanged between the IVs of the same and of different users such as: by copying IOs from the personal IV of another user (Users can make their personal IVs accessible to other users. An IV can be Shared 510 (read/write), Visible 512 (read) or Private 514; by sending IOs to a particular user or group of users through the integrated instant messaging system or a commercial instant messaging system; by sending IOs to a particular user or group of users through email; by making IOs available through shared file systems; and by retrieving IOs from our database (The database automatically collects and organizes IOs from the IVs of different users.

A variety of data visualization and access tools allow for the easy retrieval of IOs from the database, for example, in conjunction with an agent system; and by retrieving IOs from a Discovery View. The Discovery View presents individual users with a custom selection of potentially relevant IOs, and in one embodiment consolidates the Exchange View 315 and Database View 310. In this embodiment, the Discovery View not only displays related information in the IO database 125 but can also display related information found by other web services (e.g., related products for one selected product provided by online sellers or search engines).

Video feeds often produce long recordings (measured in minutes or hours). The analysis of video feeds usually focuses on particular segments of video recordings (measured in seconds). Embodiments disclosed herein, include techniques to cut video recordings into smaller segments and represent these video segments (also referred to as video clips) as multi-functional Cards (default representation for information objects).

As shown in FIG. 4, a Card 600 used for video clip in one embodiment displays a still image in a multimedia bar 620, for example, (a frame near the beginning of the video clip), a title bar 602, a heading text bar 614, a function bar 622, and a ratings bar 624. The function bar 622 includes an attachment icon 604 that allows users to access the attached or referenced video clip and a conversation icon 606 which can indicate an ongoing conversation or new messages, for example, indicated with a unique color display. Cards can be related to one another through hyperlinks, tags, spatial arrangements, as well as time and location information (described below). A ratings bar 624 can include user rating icon 608 (e.g., relevance) and a combined rating icon 610 which includes the ratings of several users.

The Card 600 is one particular representation of an information object. As shown in FIG. 4B, the Card 600 appearance and functionality are customizable. The Card 600 can optionally be configured to include the title bar 602, the multimedia bar 620 to display text, pictures, videos and executables (for fast visual accessibility of information). Executables include applications that can run and display information inside the multimedia area of the Card 600. For example, an executable could provide an interactive weather map or a movie running in a movie player. The Card 600 can further include, the function bar 622 to monitor and access object tools such as instant messaging, the ratings bar 624 to indicate priority levels of importance, reliabililies, etc., a time bar 628 to visualize the time and duration of events, video clips, etc., a tag bar 630 to categorize objects, a progress bar 632 to indicate task progression and the heading text bar 614 to label objects.

Video recordings are processed into smaller video clips that are represented as Cards to be considered individually. In one embodiment, segments of multimedia data represented as the information object are provided by capturing motion detection segments from security cameras. Here a card can represent a video clip manually cut (or uncut but marked with a start and end position) by a user or automatically cut by a software or hardware system (e.g., motion detection, infrared detection, etc.).

In one embodiment, the graphical user interface 132 allows a participant 108 to capture a video clip as the information object in response to one of the plurality participants dragging and dropping a reference to a video from a web-site to one of the plurality of views. Objects that represent video clips can be manually created by dragging and dropping a reference to a video from a web-site onto the one of the views (e.g., a YouTube video can be dragged and dropped from the YouTube web-site to the Workspace View 300)

Figure 5A:
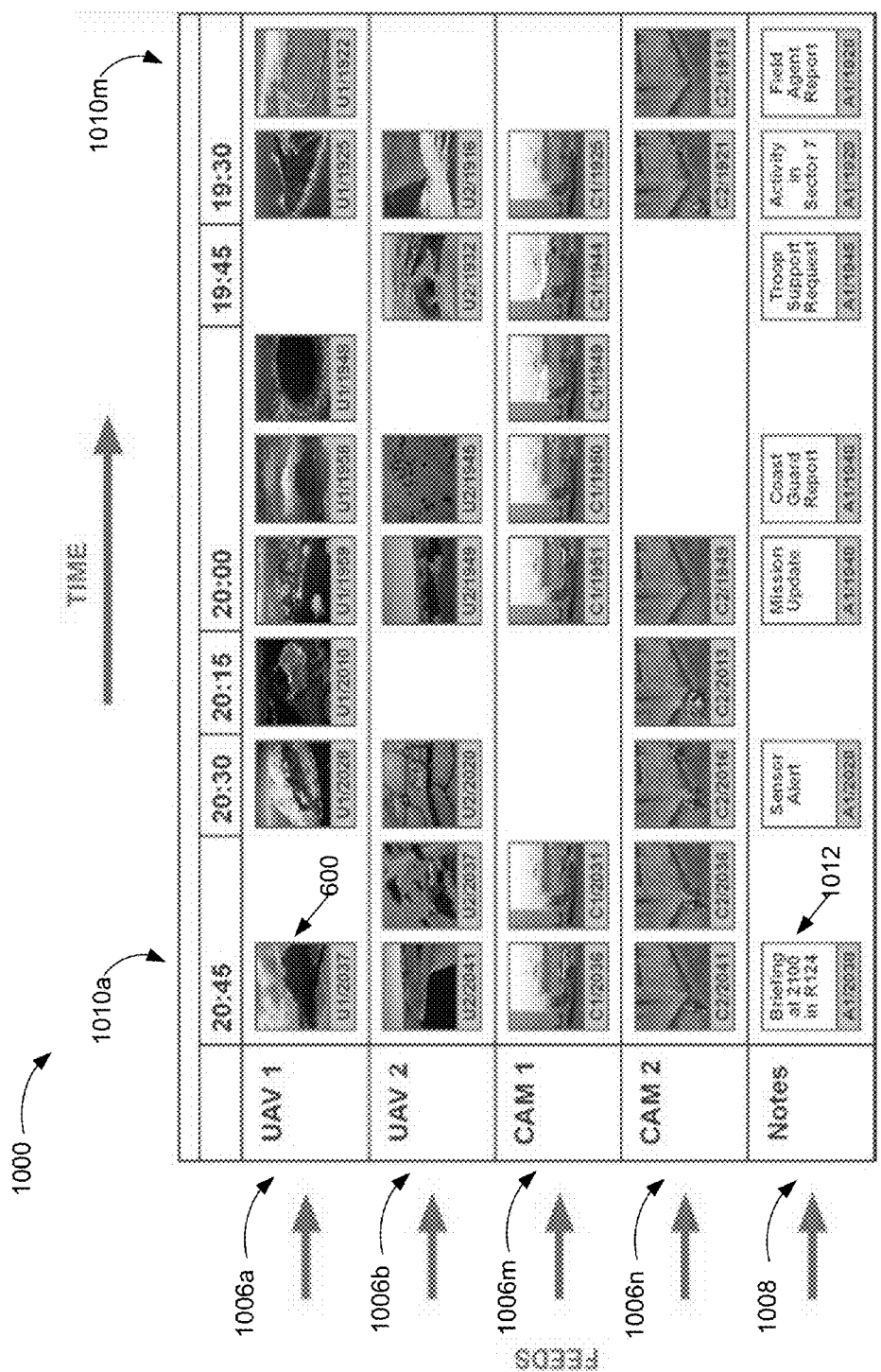
FIGS. 5A-5C are diagrams of an exemplary graphical user interface (GUI) organization that displays multimedia objects from multiple different sources in a source time matrix News view in accordance with one example embodiment disclosed herein.

Now referring to FIG. 5A, an exemplary News View 1000, similar to the News Views described in related patent applications, can additionally display the flow of video clips from multiple different sources to prevent overwhelming analysts 108 with the display of too much information. The News View 1000 is designed to help analysts 108 monitor the submission of video clips generated by participants and automated systems. The News View 1000 visualizes video clips as Cards in a source-time matrix. Rows 1006a-1006n represent different video clip sources (or groups of sources) and columns 1010a-1010m represent different points in time (or time segments). New Cards are posted on the left pushing existing Cards to the right. Here, the News View 1000 displays information from five different video sources. The first two rows 1006a-1006b include video clips from two UAVs (Unmanned Aerial Vehicles) (UAV 1, UAV 2), rows 1006m-1006n include video clips from two security cameras (CAM 1, CAM2), and the last row 1008 includes relevant notes posted by participants or computational systems (e.g., alerts, reminders and reports).

The News View 1000 provides various features to optimize the available display space. First, the time-line in the News View 1000 can be linear or compressed as shown in FIG. 5A.

Figure 5B:
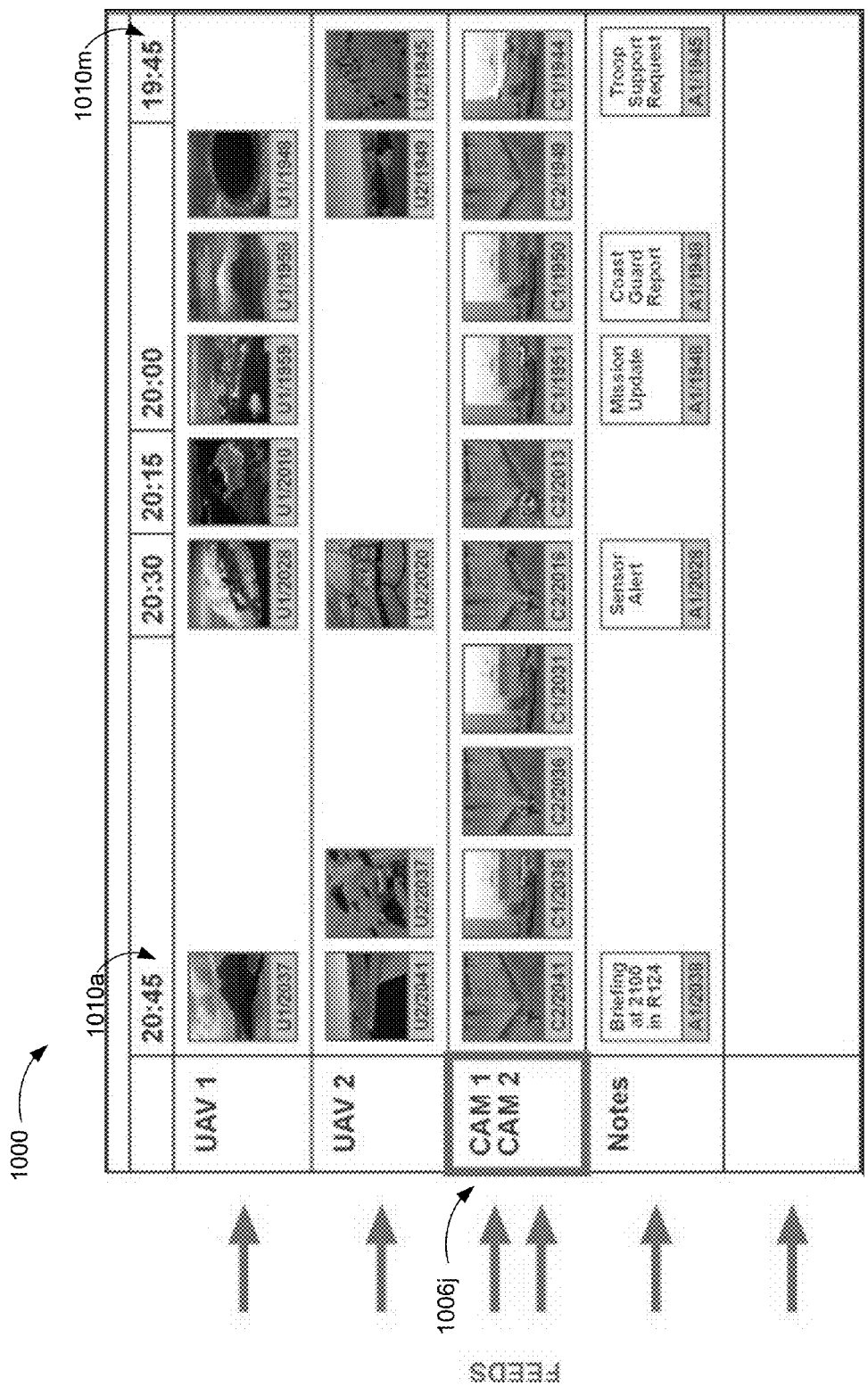
Figure 5C:
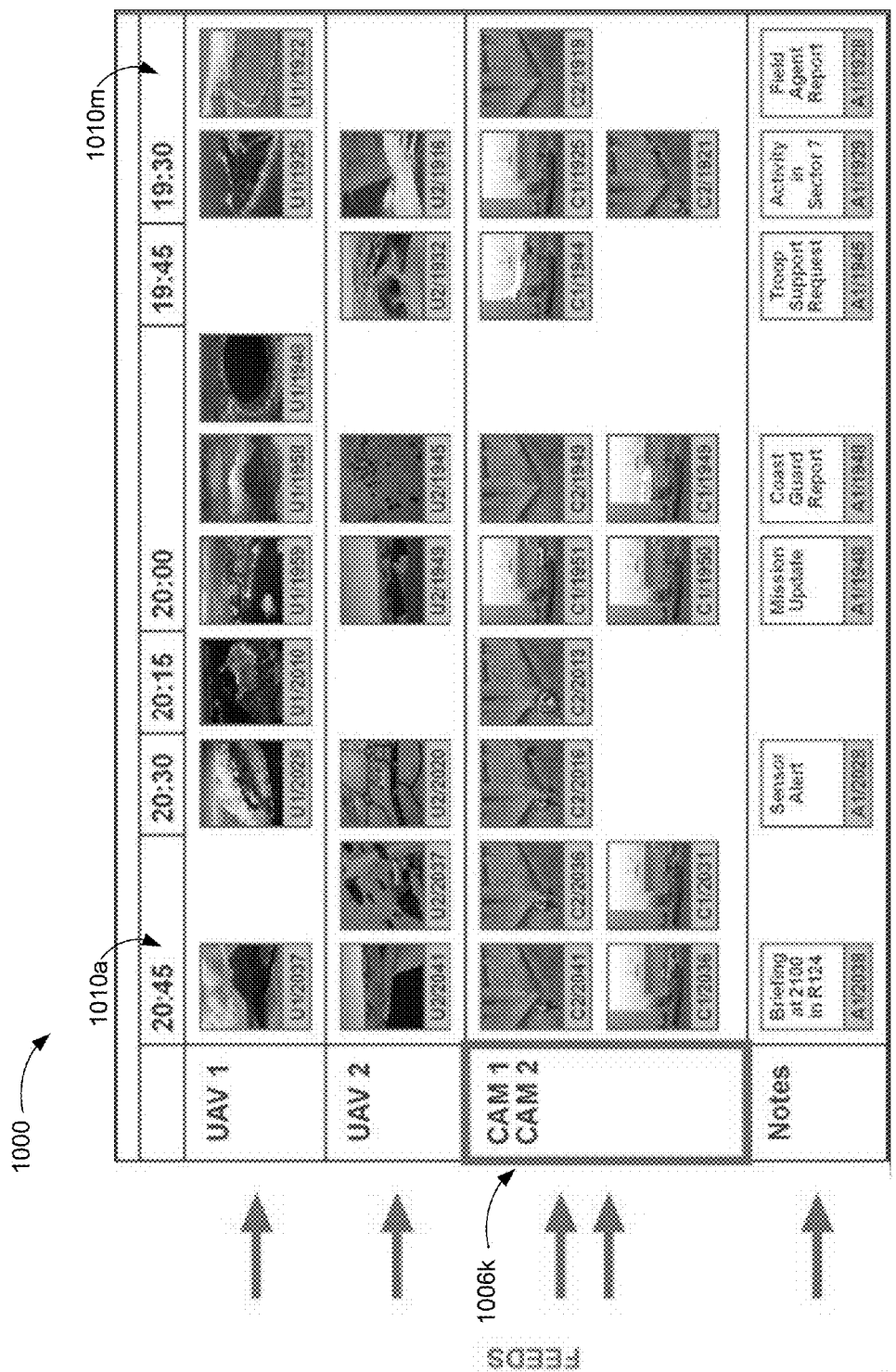

A compressed time-line only displays time segments that include Cards. Secondly, as shown in FIG. 5B, more than one feed can be displayed in one News View row. Row 1006j includes feeds from two different cameras. This allows for the consolidation of rows that generally display fewer cards than other rows. Thirdly, as shown in FIG. 5C a row 1006k that includes significantly more cards than other rows can automatically expand in height to allow for more cards to be displayed within a given time segment. This allows multiple information feeds can be combined in one News View row 1006.

Figure 6:
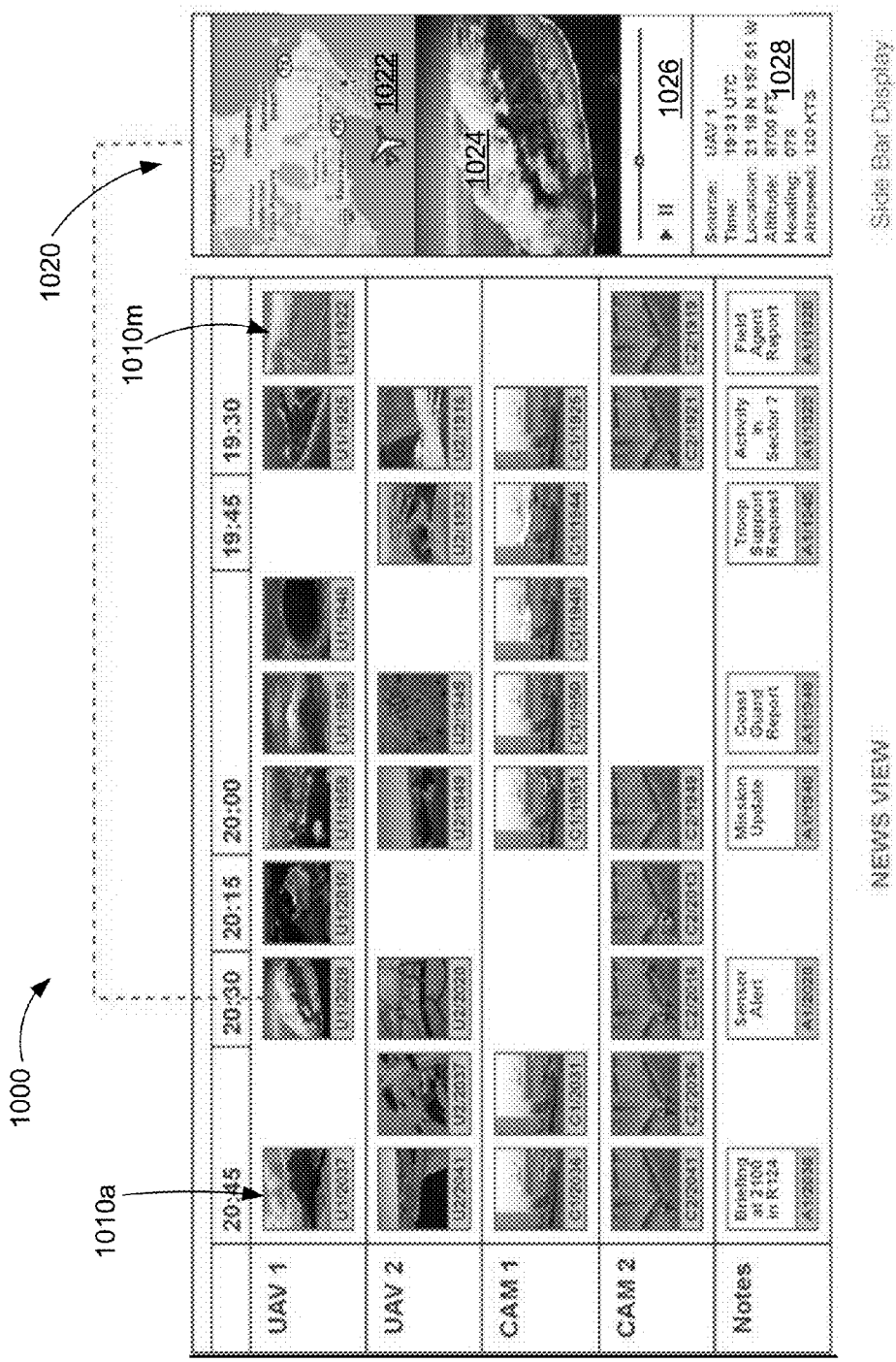
FIG. 6 is a diagram of the News View of FIG. 5A including a Side Bar in accordance with one example embodiment disclosed herein.

As shown in FIG. 6, the system 110 provides a customizable Side-Bar 1020 that can display information associated with one or more selected Cards. The Side Bar 1020 is primarily used to view card information that is not visible on the Card 600 itself. For example, the Side Bar 1020 includes a Map Display 1022 that indicates the geographic location associated with a video clip. The Side Bar 1020 can also include a Clip Viewer 1024 with controls 1026 for viewing referenced or attached video clips. Furthermore, the Side Bar 1020 includes an information panel 1028 to view additional information such as UAV heading and altitude. The Side Bar 1020 provides a convenient way for analysts to quickly access detailed information about Cards without switching from the News View 1000 interface on the display 130.

Figure 7A:
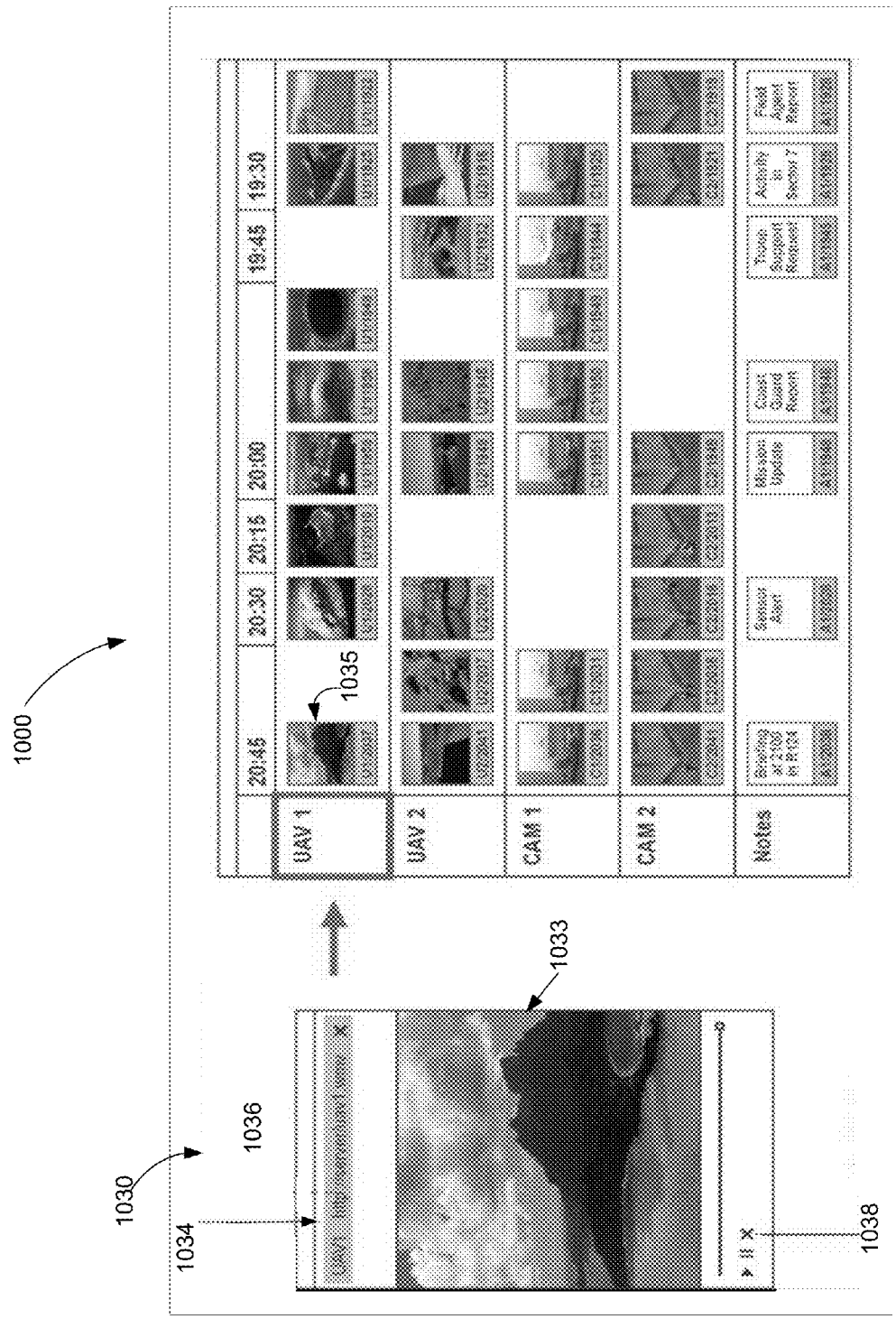
FIGS. 7A-7C are diagrams of an exemplary Feed Input Manager used in conjunction with the News View of FIG. 5A in accordance with one example embodiment disclosed herein.
Figure 7B:
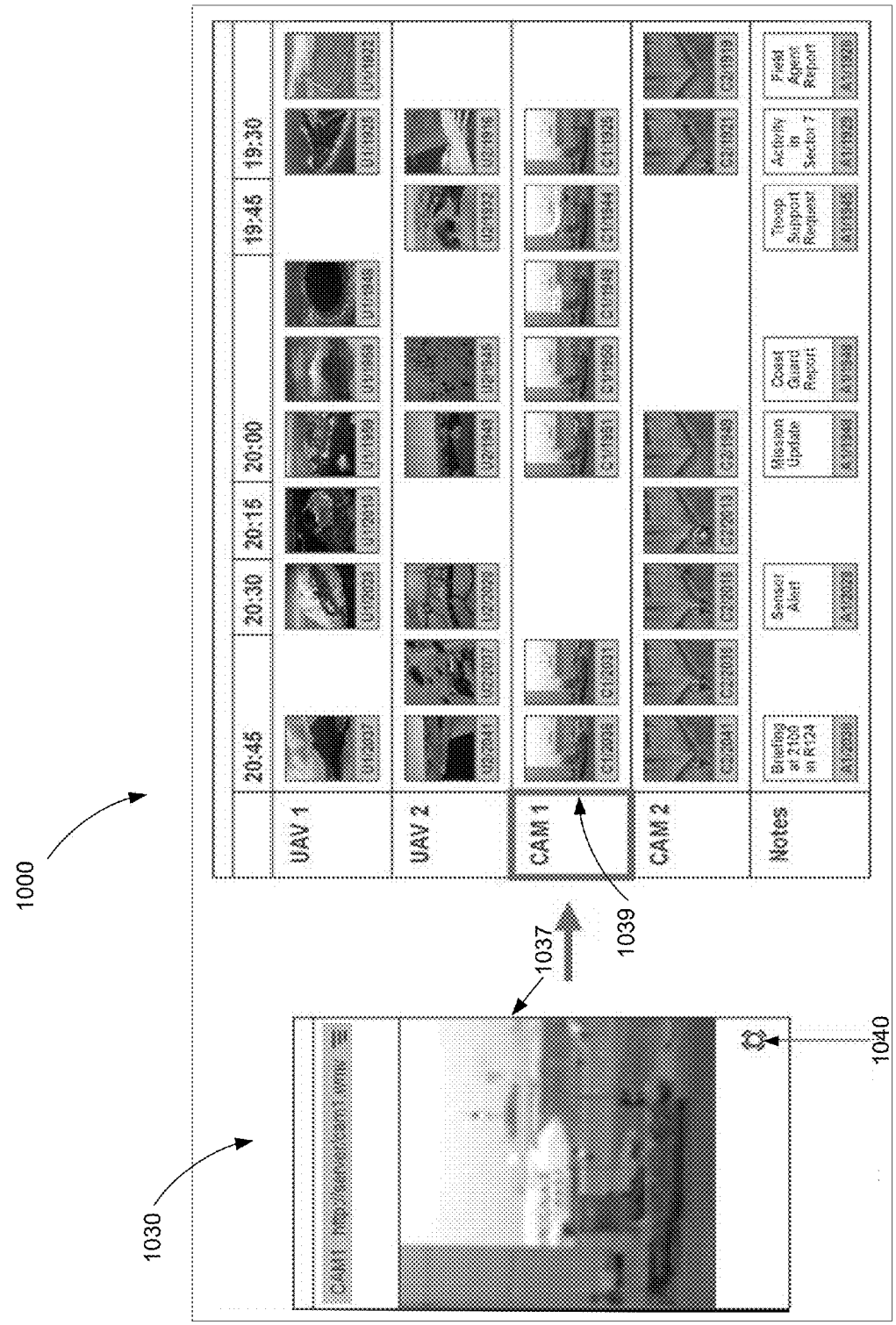

Now referring to FIG. 7A, the Feed Input Manager 184 provides a graphical user Feed Input interface display 1030 for cutting video feeds and for posting Cards on a News View 1000. The Feed Input interface display 1030 includes a list of possible video feeds 1034 and a highlighted selected feed 1036 which indicates the video feed of the selected video input source, for example, a UAV. The UAV operator 108 uses a Cut Button 1038 whenever the operator detects suspicious activity. A click on the Cut Button 1038 extracts a small segment from a video feed 1033 (e.g. 10 seconds before and 5 seconds after the click), packages the video clip as a Card 1035 and posts it on News View 1000. In FIG. 7B, the Feed Input Manager 184 displays a video clips 1037 (e.g., 15 seconds) from a security camera. A Card 1039 may also be automatically generated whenever the camera detects motion or receives a signal from a sensor. This particular option is beneficial for the simultaneous monitoring of large numbers of security cameras. For example, a security guard might need to monitor fifty different security cameras. The Feed Input Manager would automatically import short video sequences from cameras whenever motion is detected and package those video clips as Cards 600. The News View 1000 would present an overview of motion detected by security cameras and organize the resulting Cards 600 by source and time.

Figure 7C:
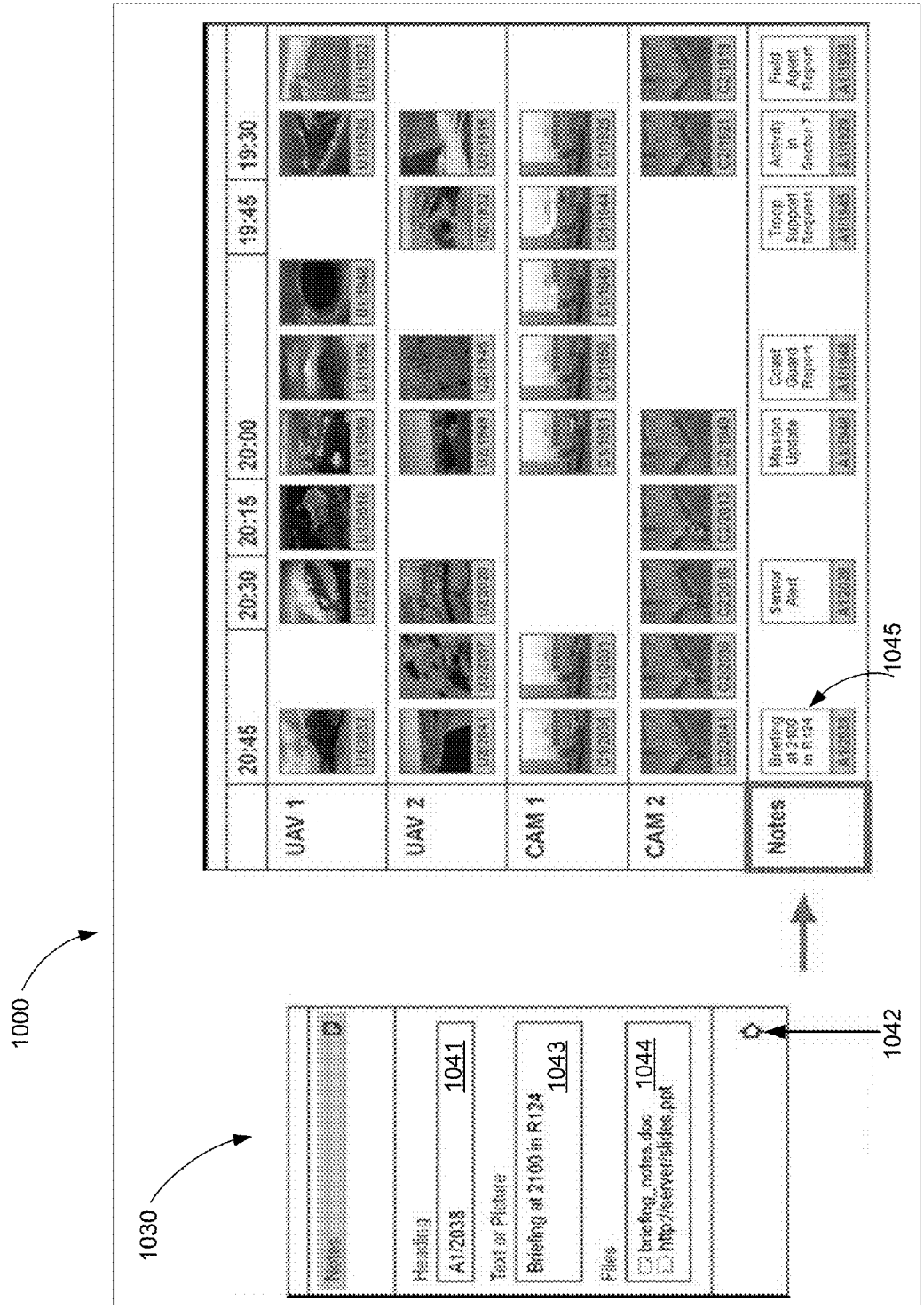

Submit button 1040 causes the Feed Input Manager 184 to display an option (shown in FIG. 7C) for users to manually create Cards (that may or may not include video clips). The Feed Input Manager 184 allows a user to insert a heading 1041, a text or picture 1043, as well as attachments and URLs 1044. After the user completes the entries, for example, by clicking on a post button 1042, the information is packaged as a Card 1045 and posted on News View 1000. The graphical user interface 132 provide controls for assigning a start time and an end time such that the video clip is displayed as a snippet having a shorter duration than the video clip; and the start time and end time of a video clip can be modified by a participant creating the object and by a participant sharing the object.

Figure 8:
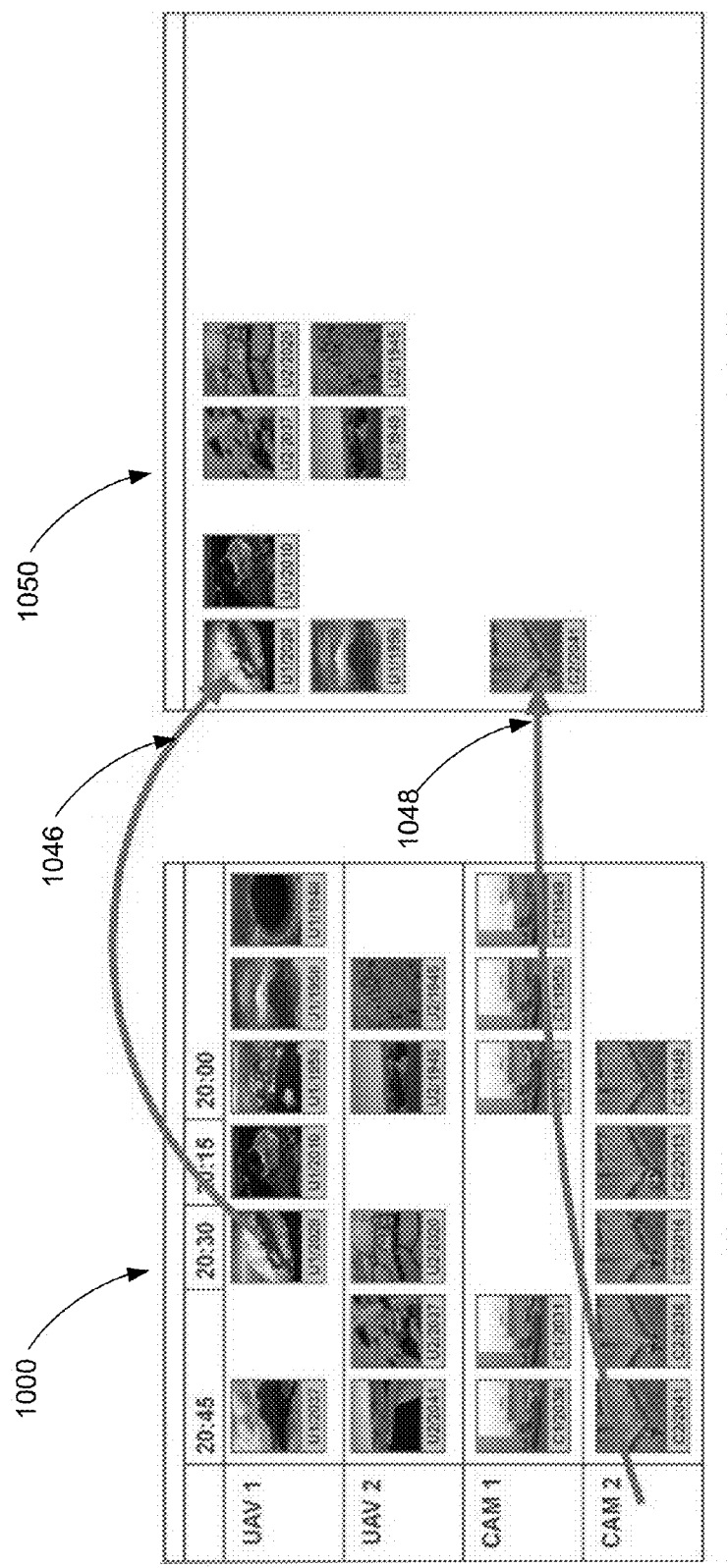
FIG. 8 is a diagram of a graphical user interface (GUI) which allows the users to select and copy objects from a News View to and Card View for subsequent and analysis in accordance with one example embodiment disclosed herein.

FIG. 8 shows additional features of a Card View 1050. The Card View 1050 is a repository for Cards that require further investigation. Analysts 108 can copy (as indicated by arrow 1046) Cards from the News View to the Card View 1050 and spatially arrange Cards on the Card View 1050. Analysts can also copy information from other sources to the Workspace View (e.g. videos from UAV video feed databases or YouTube). The Card View 1050 provides analysts with the means to consolidate relevant information associated with a particular task. The system 110 provides several ways of organizing Cards on Card Views: (i) Cards can be added and moved between multiple different Card Views; (ii) Cards can be hierarchically structured by spatially locating smaller Cards inside bigger Cards (smaller Cards inside bigger Cards remain physically connected) or by associating Cards with Card Views (a hyperlink between a Card and a Card View); (iii) Cards can be grouped through the spatial arrangement of Cards (a "magnet" mechanism automatically snaps together Cards in close proximity); and (iv) Cards can be automatically lined up in a sequence from left to right and top to bottom. The sequence can be modified by moving a Card to a different location. Cards can be static or dynamic. The visual presentation and data associated with static Cards is controlled by the user while dynamic Cards automatically retrieve updates from dynamic information sources. Information copied from the News View 1000 to the Card View 1050 can result in either static or dynamic Cards. For example, coping a News View 1000 row heading (rather than a Card) to a Card View 1050 (as indicated by arrow 1048) produces a dynamic Card whose contents reflect the most recent Card in the News View 1000 row. In FIG. 8, the fourth row of the News View 1000 displays the video clips produced by camera 2. Copying the CAM2 row heading onto a Card View 1050 produces a Card that displays the most recent motion detection of camera 2. Dynamic Cards primarily benefit analysts who use the Card View 1050 as an information dashboard rather than a space for collecting information. Dynamic Cards can also be manually created to display web accessible contents such as weather updates.

Figure 9A:
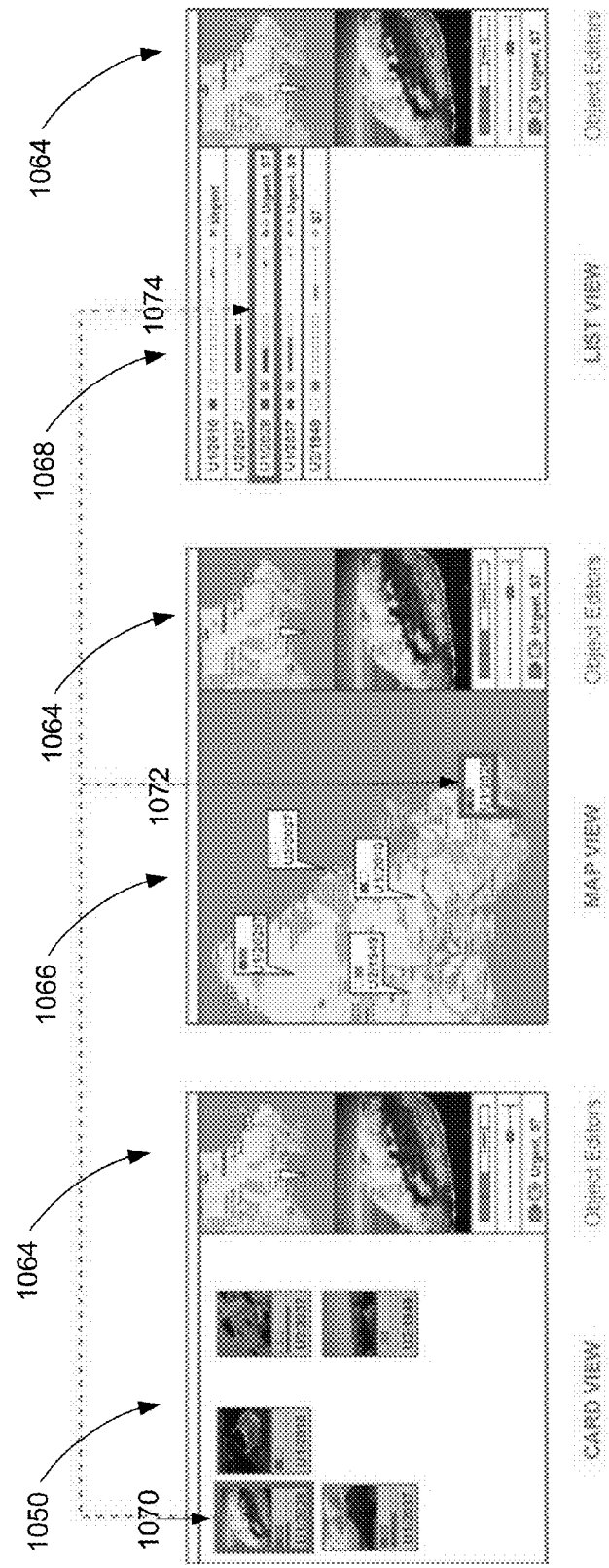
FIGS. 9A-9B are diagrams of a GUI including Object editors to display multimedia objects in selected views and to allow users to edit the objects in accordance with one example embodiment disclosed herein.
Figure 9B:
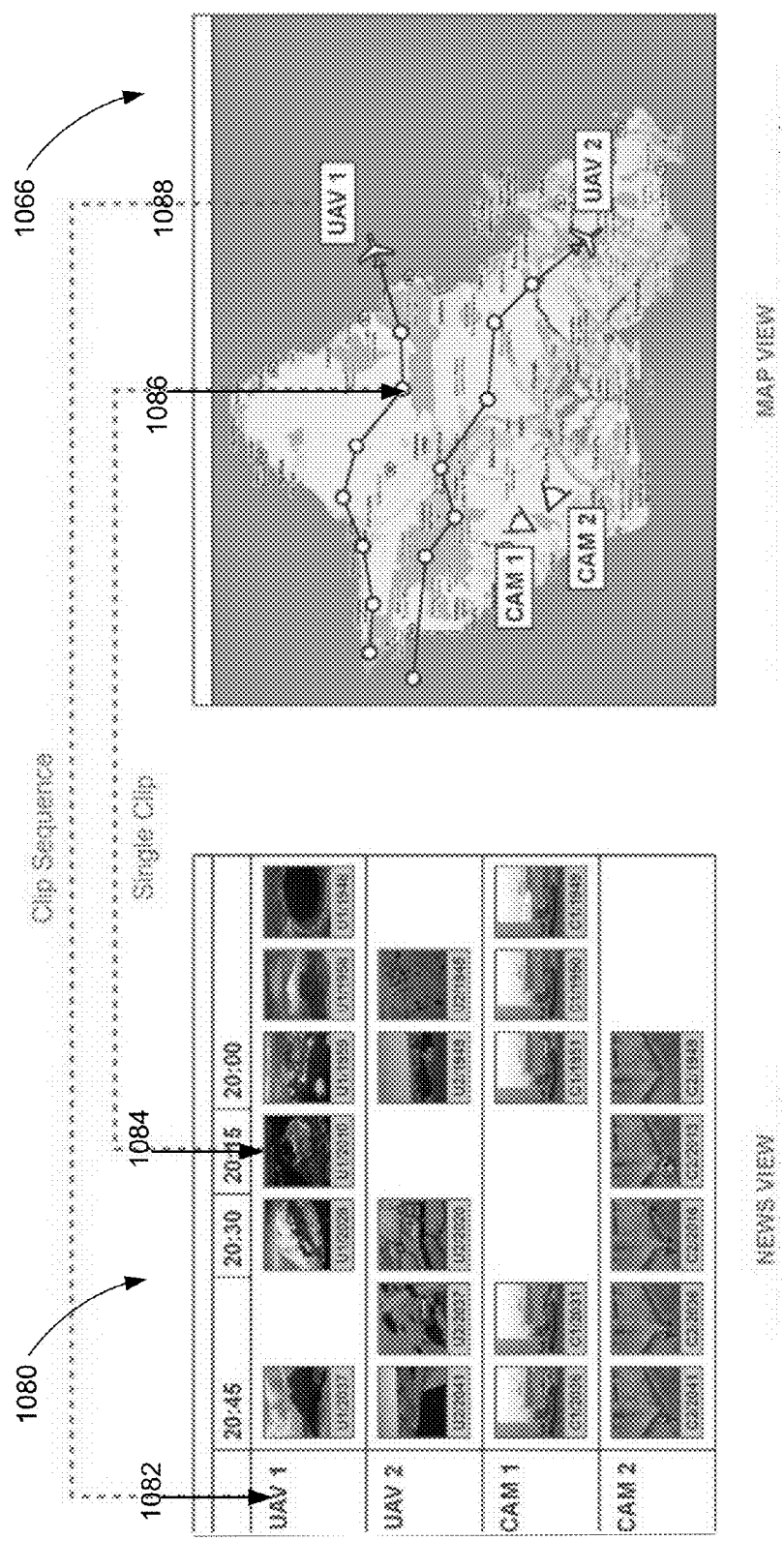

The optimal visualization of information often depends on the type of information, the task and the preferences of the users. Referring now to FIG. 9A, the system 110 allows objects to be rendered in many different ways, for example, as Card 1070 on a Card View 1050, geographic marker 1072 on a Map View 1066, or a row 1074 on a List View 1068. The functionality of objects and the accessibility of object data in a Side Bar (including object editors) 1064 is similar for any object representation and view. In other words, if an object is moved from one type of view to another it changes its appearance but not its content and functionality. Users 108 have the option to view the same information on multiple different types of views or use multiple different types of views for different tasks. FIG. 9B demonstrates the display of the same objects on a News View 1080 and a Map View 1066. Here, object 1082 is a video clip sequence on the News View 1080 which is represented on the Map View 1066 related to flight path 1088. Object 1084 is a single video clip on the News View 1080 which is represented on the Map View 1066 as indicated by a geographical location 1086. The Map View 1066 complements the News View 1080 with an overview of geographic locations associated with available video clips. Furthermore, the Map View 1066 visually connects locations that have been produced by the same information source (useful for mobile information sources such as UAVs).

Figure 10:
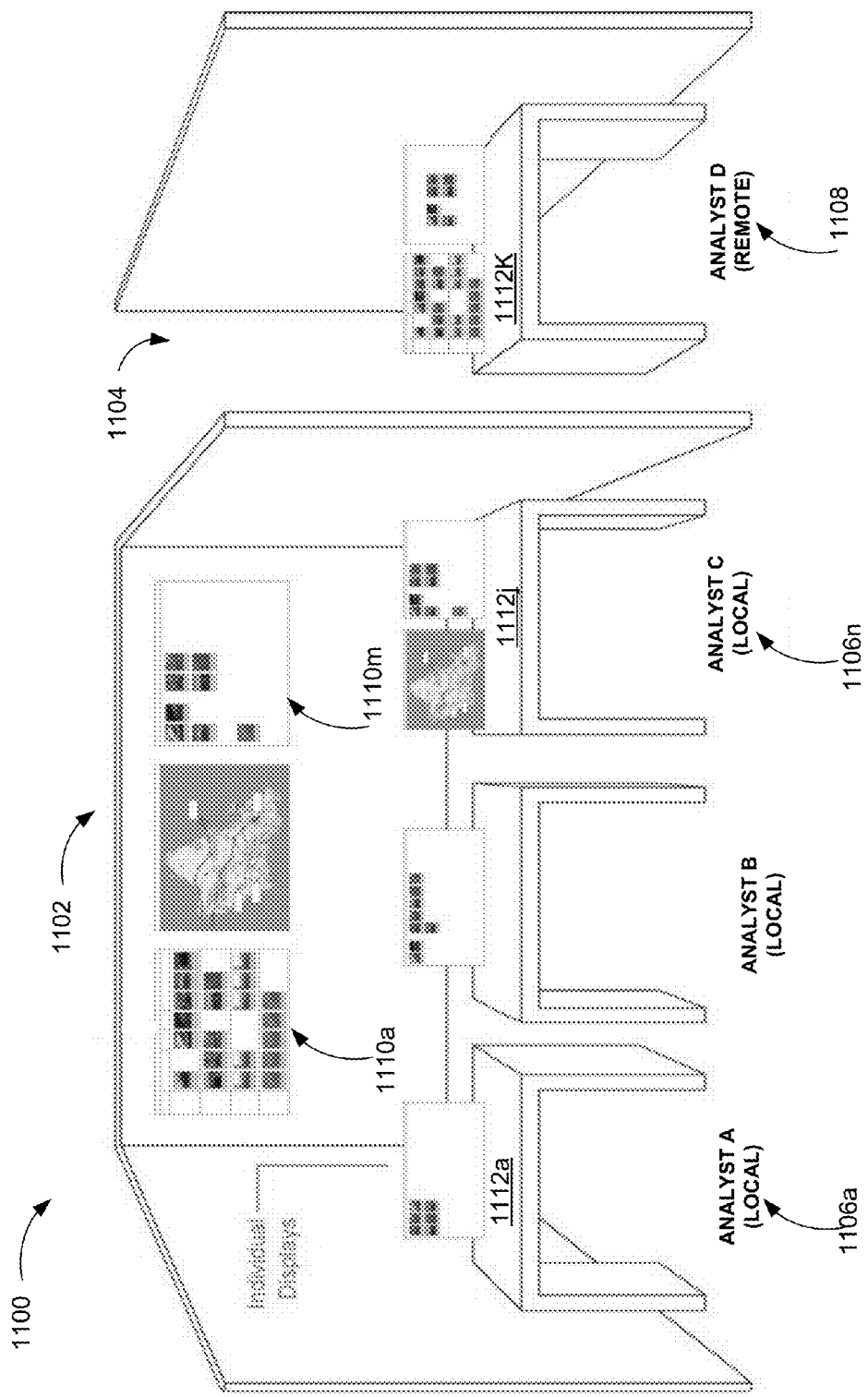
FIG. 10 is a diagram of a collaborative setting involving multiple analysts and different types of Views in accordance with one example embodiment disclosed herein.

Representing objects in different ways and moving objects between different types of Views is especially important in collaborative settings. FIG. 10 illustrates a collaborative setting that involves a plurality of analysts 108 (A-D) who use individual views 1112a-1112k (also referred to as private view 1112 and collectively referred to as individual views 1112) for the personal analysis of information, and shared views 1110a-1110m (collectively referred to as shared views 1110) for the display of information of common interest. Analysts A-C reside in the same location 1102 while Analyst D participates remotely at location 1104. The analysts can copy objects between their individual views 1112 as well as between individual views 1112 and shared views 1110. Each analyst can view objects in ways that is most appropriate in regards to his/her investigation and area of expertise.

A participant 108 can share an object with other participants 108 who themselves can continue to share the object with additional participants which results in the creation of small teams or communities grouped around a card subject. For example, Analyst A sends Card 1 to Analyst C. Now both, analyst A and C have a copy of Card 1, can modify the Card 1, and can communicate through the Card 1. Analyst C sends Card 1 to Analyst D. Now analysts A, C and D can modify and communicate through Card 1.

Figure 11A:
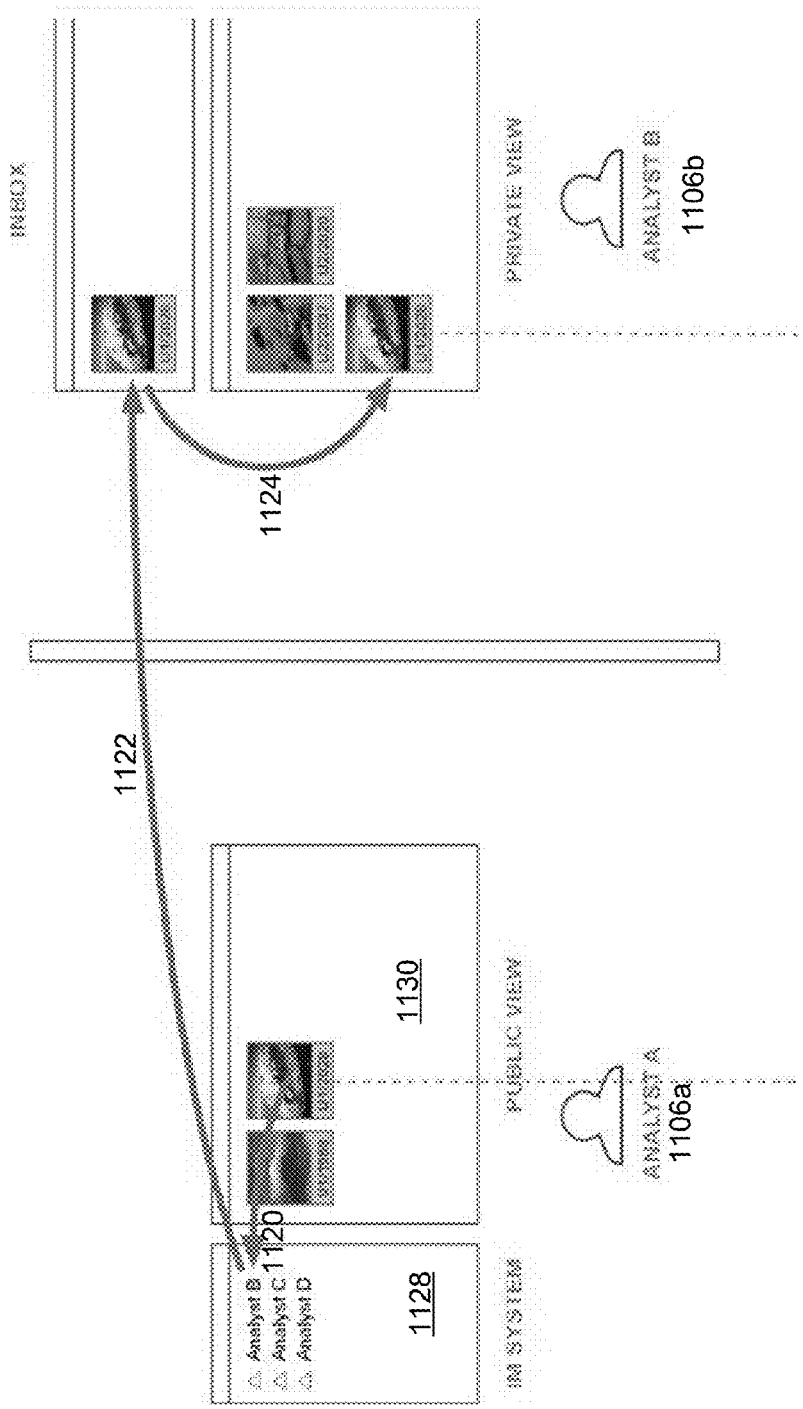
FIGS. 11A-11D are diagrams of a collaborative setting in which multiple analysts share and exchange objects in accordance with one example embodiment disclosed herein.

Analysts 108 need to effectively exchange information with their peers. The system 110 offers various options for the exchange and collaborative use of objects. For example, objects may be sent to other users through the built-in IM (Instant Messaging) system 1128 as shown in FIG. 11A. The IM system 1128 allows users to list their peers in a separate window (IM System). Users can send objects to their peers by dragging and dropping the object onto user names in the IM system 1128 (as indicated by arrow 1120), here from Public View 1130, or by dragging and dropping user names in the IM system onto objects (as indicated by arrow 1122). The recipients will receive objects in their Inbox Views from where objects can be transferred to any other View, here private view 1112b (as indicated by arrow 1124). Generally, in a private view (which is not shared among analysts), only the owner can see and modify the view. The original object and the object copy remain synchronized meaning that any modification to either Object will be reflected in the other Object.

Figure 11B:
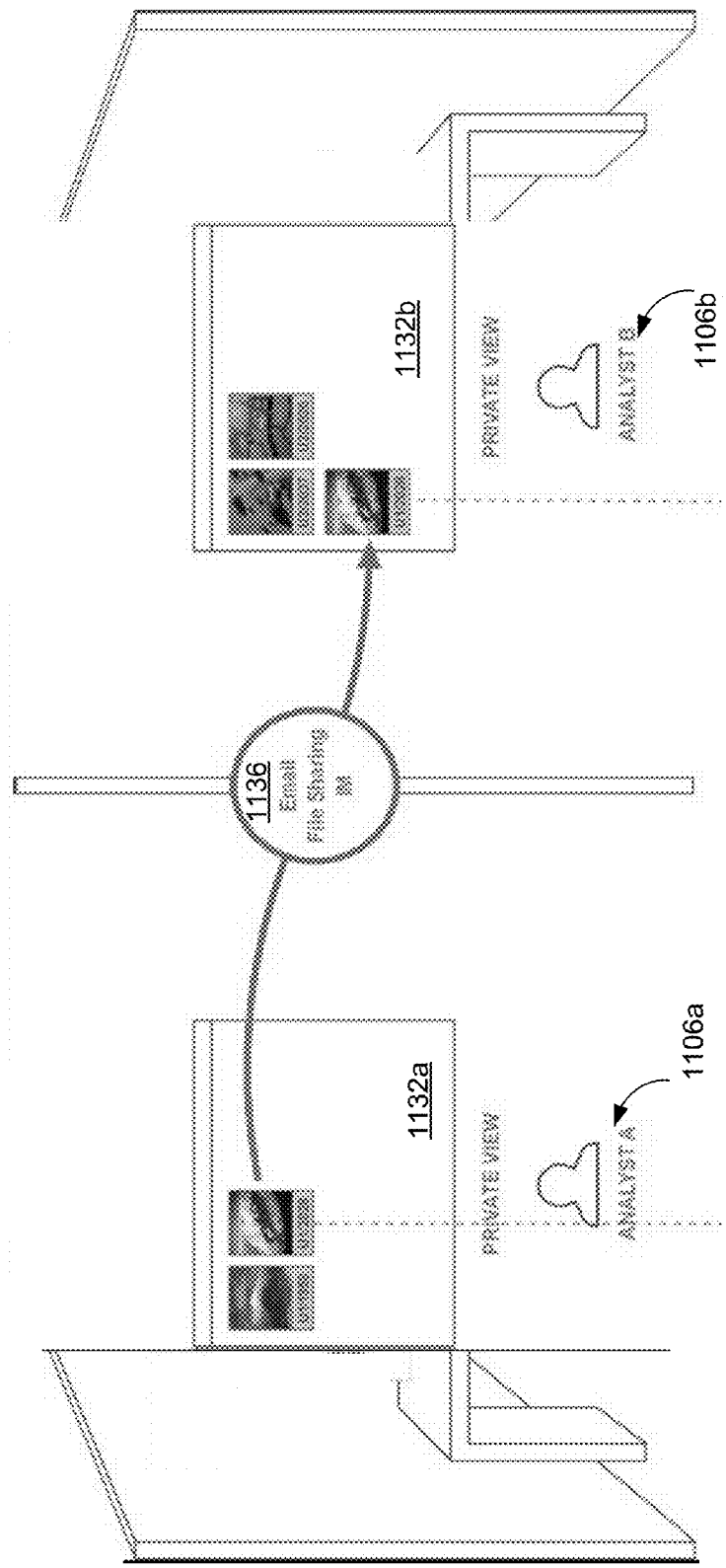

Objects may also be exchanged through conventional third party applications 1136 such as email, file sharing or instant messaging (as shown in FIG. 11B). Objects exchanged through third party applications will only be synchronized for users that are connected through the IM system.

Figure 11C:
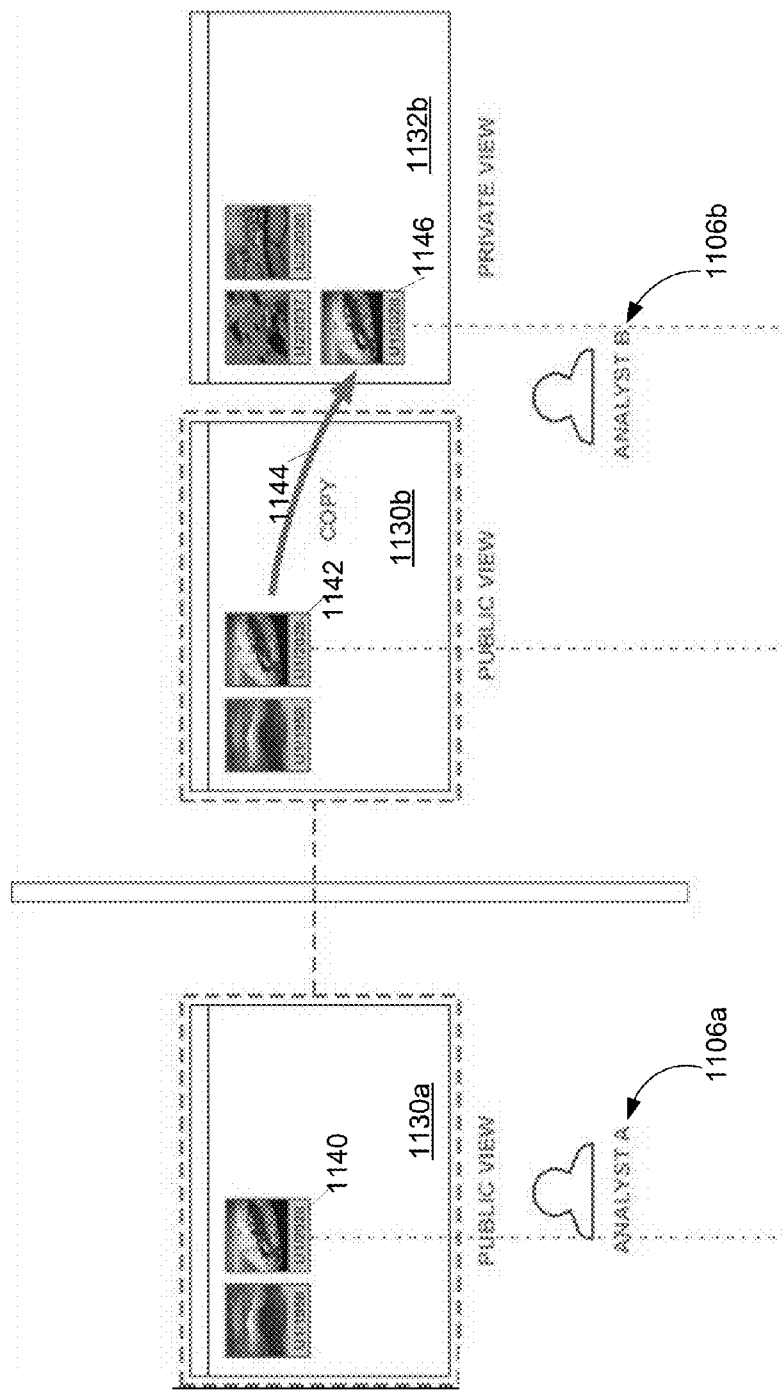

Now referring to FIG. 11C, objects may be exchanged through the use of shared views. The example in FIG. 11C includes two analysts, analyst A 1106a and analyst B 1106b. Here, analyst A allows analyst B to access (read only or read/write) his/her View thus enabling analyst B to copy object 1140 from analyst A's 1106a Public View 1130a to object 1142 in analyst B's Public View. Subsequently, analyst B can copy object 1142 in analyst B's Public View to object 1146 to analyst B's Private View as indicated by arrow 1144. This example illustrates two users who exchange objects through Public Views 1130a and 1130b. Generally, in a public view (which can be shared among analysts), invited collaborators can see, copy from, and modify the view. The simultaneous use of private and public Views enables users to separate information of individual and common interest as well as to protect private information.

Figure 11D:
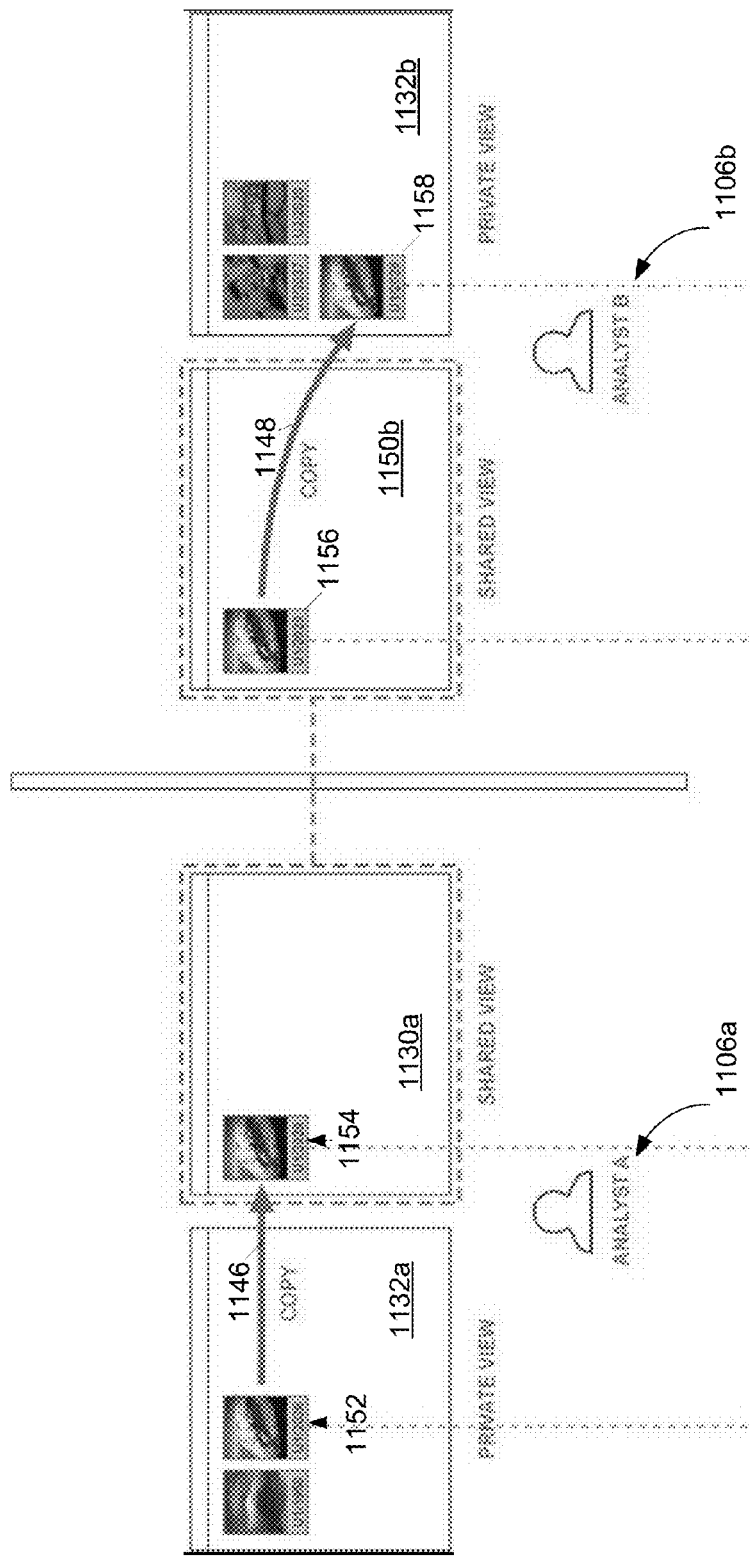

In another operational scenario, shown in FIG. 11D, multiple analysts share a View among themselves without using private Views. In this scenario the analysts physically sit next to each other and collaboratively operate the same View. Here Analysts A and B copy and share objects 1152, 1154, 1156 and 1158 as indicated by arrows 1146 and 1148. This particular scenario benefits analysts who collaborate closely and have neither the time nor the need to distinguish between private and public information.

Figure 12A:
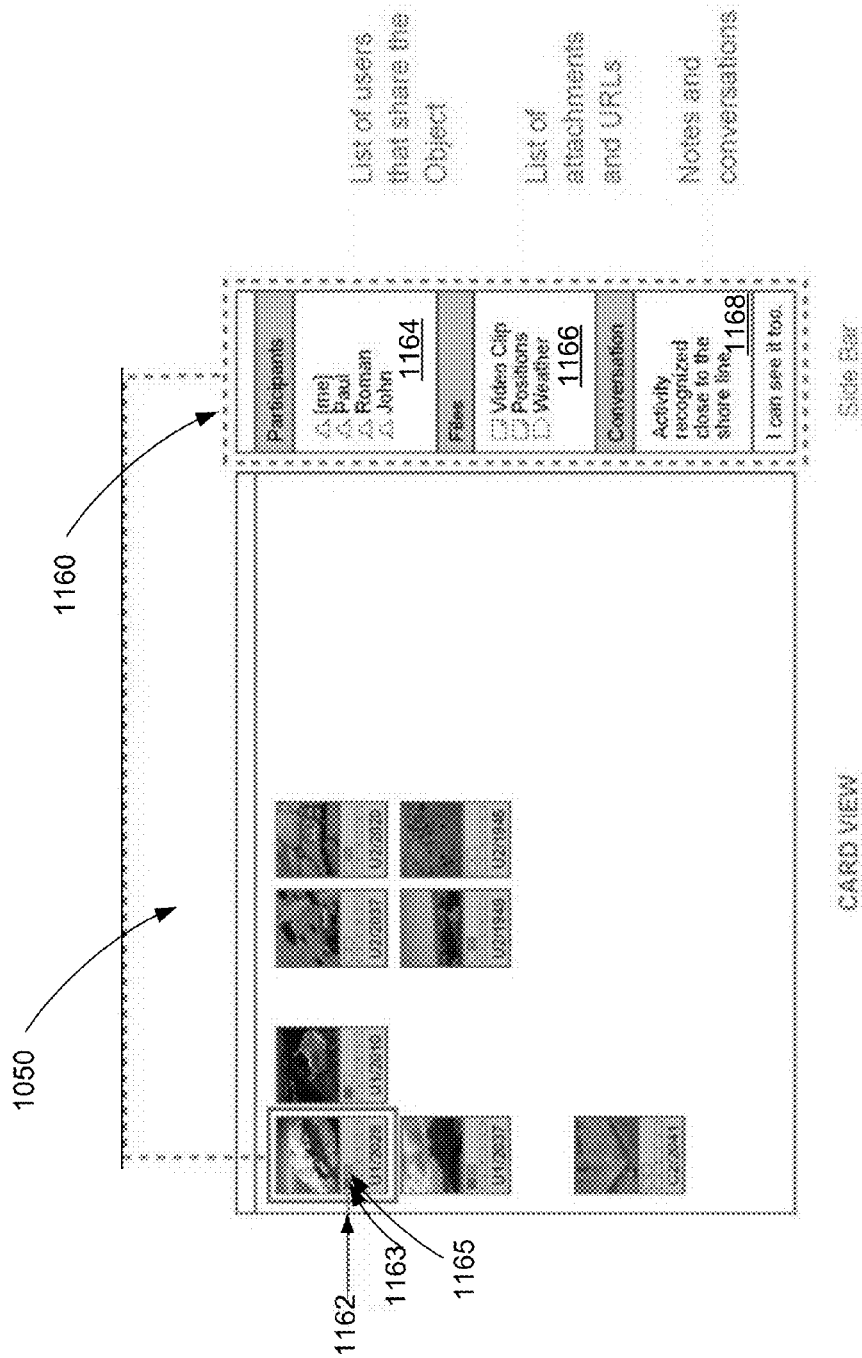
FIGS. 12A-12B are diagrams of a Card View and News View including a Side Bar to facilitate communication among participants in accordance with one example embodiment disclosed herein.
Figure 12B:
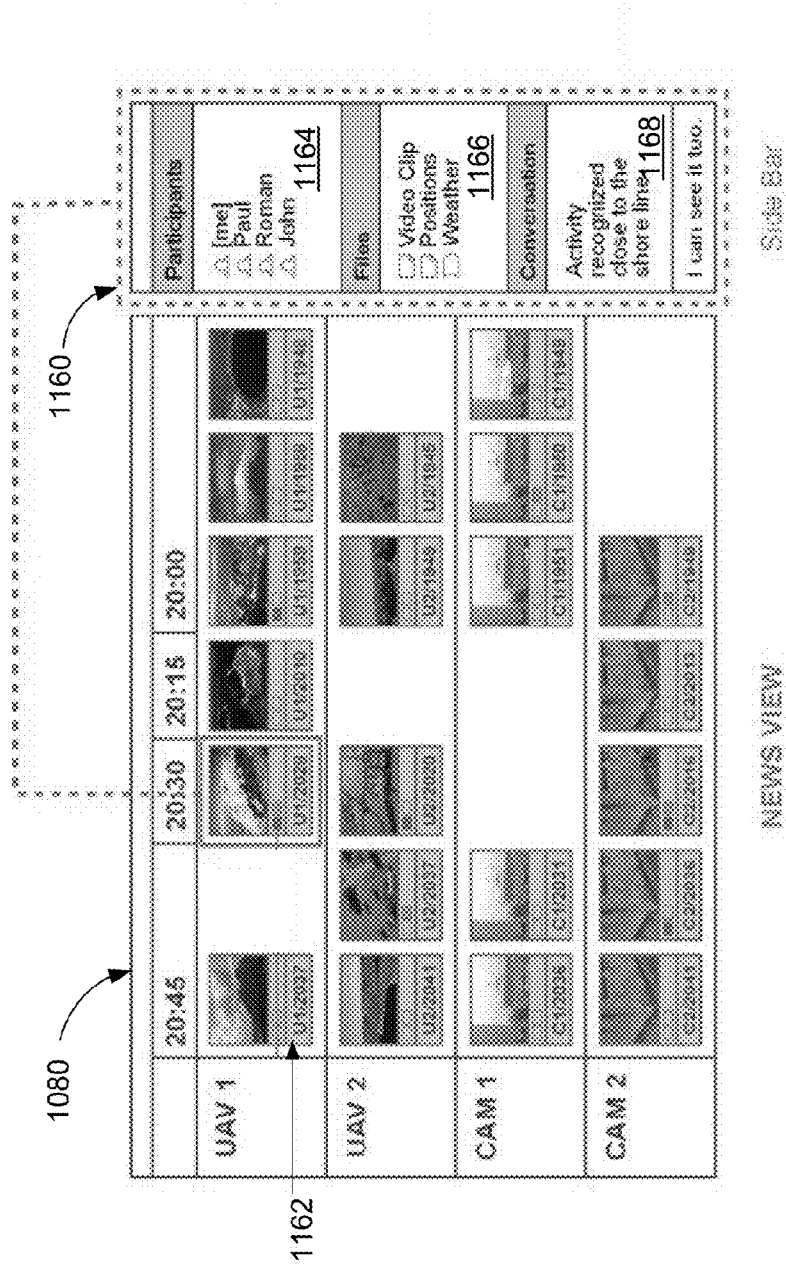

Now referring to FIGS. 12A and 12B, a Card View 1050 and a News View 1080 each include a Side Bar 1160 that displays a few communication relevant panels. The first panel 1164 displays a list of users that share the Object. A second panel 1166 lists attachments and URLs attached to the Object. A third panel 1168 includes a chat tool for users to discuss the Object. The Card 1162 representation of the Object itself includes several indicators (as described above in conjunction with FIG. 4B). Objects can be used as a means to communicate with other users. Objects include various communication functions such as instant messaging (for conversations), file repositories (for file sharing), drawing tools (shared white board), and rating tools (FIG. 4B). For example, a user 108 might create an object that represents a particular subject the user wants to discuss with one or more other users. The user would invite other users into the discussion by dragging and dropping user icons from the IM system onto the object. Each user who holds a copy of the object can now access and use collaborative object features in the Side Bar. For example, a gray bubble icon 1163 indicates that the object includes an ongoing IM discussion; a red bubble icon 1165 indicates that the object's IM system includes unread messages; and a gray file icon indicates that the object includes attachments or URL's. A benefit for the user is that the user can easily monitor large numbers of discussions with large numbers of different participants by simply monitoring the view for objects with red bubble icons 1165.

Figure 13A:
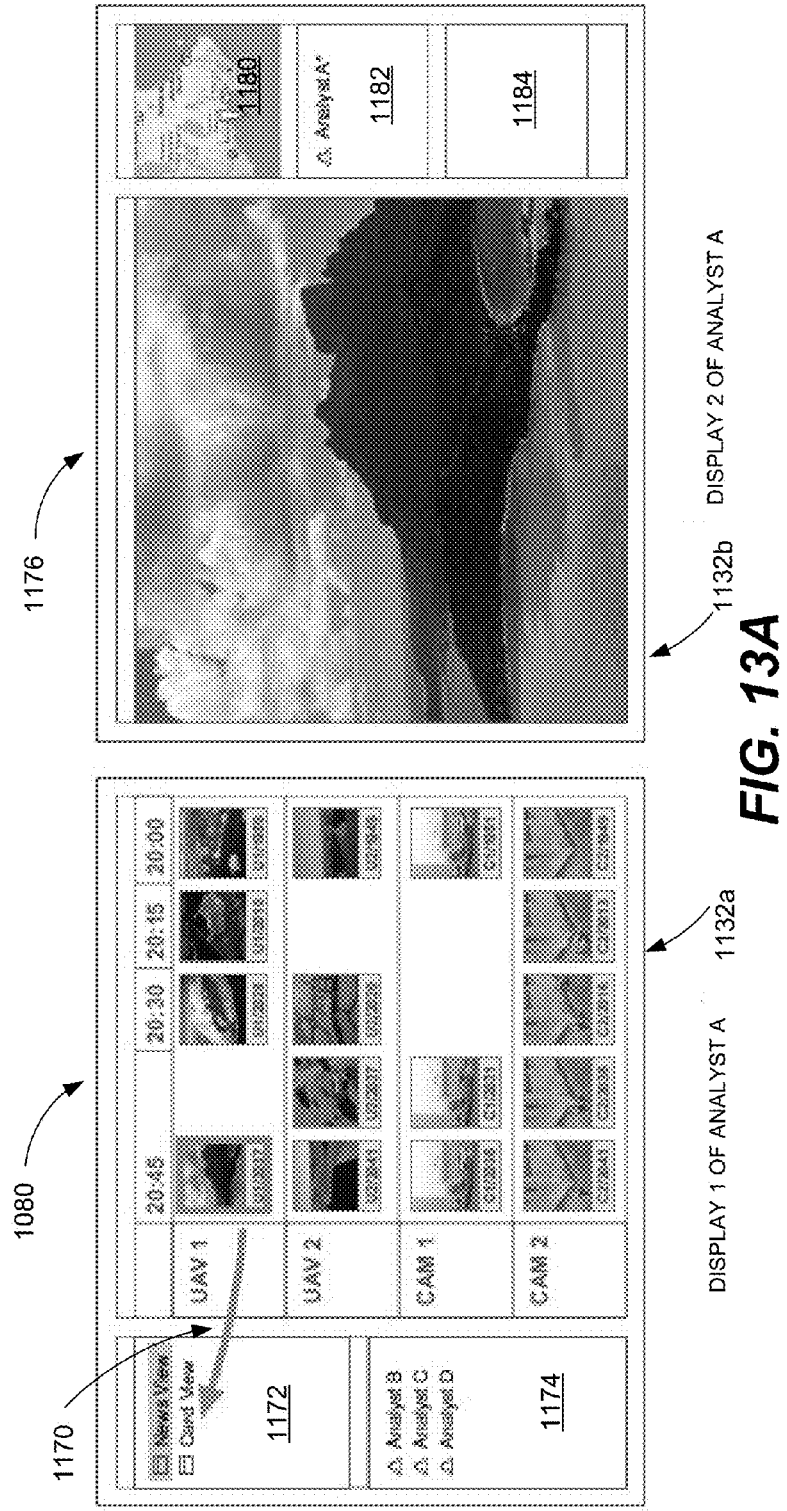
FIGS. 13A-13C are diagrams illustrating a scenario in which multiple analysts share and analyze multimedia objects in accordance with one example embodiment disclosed herein.
Figure 13B:
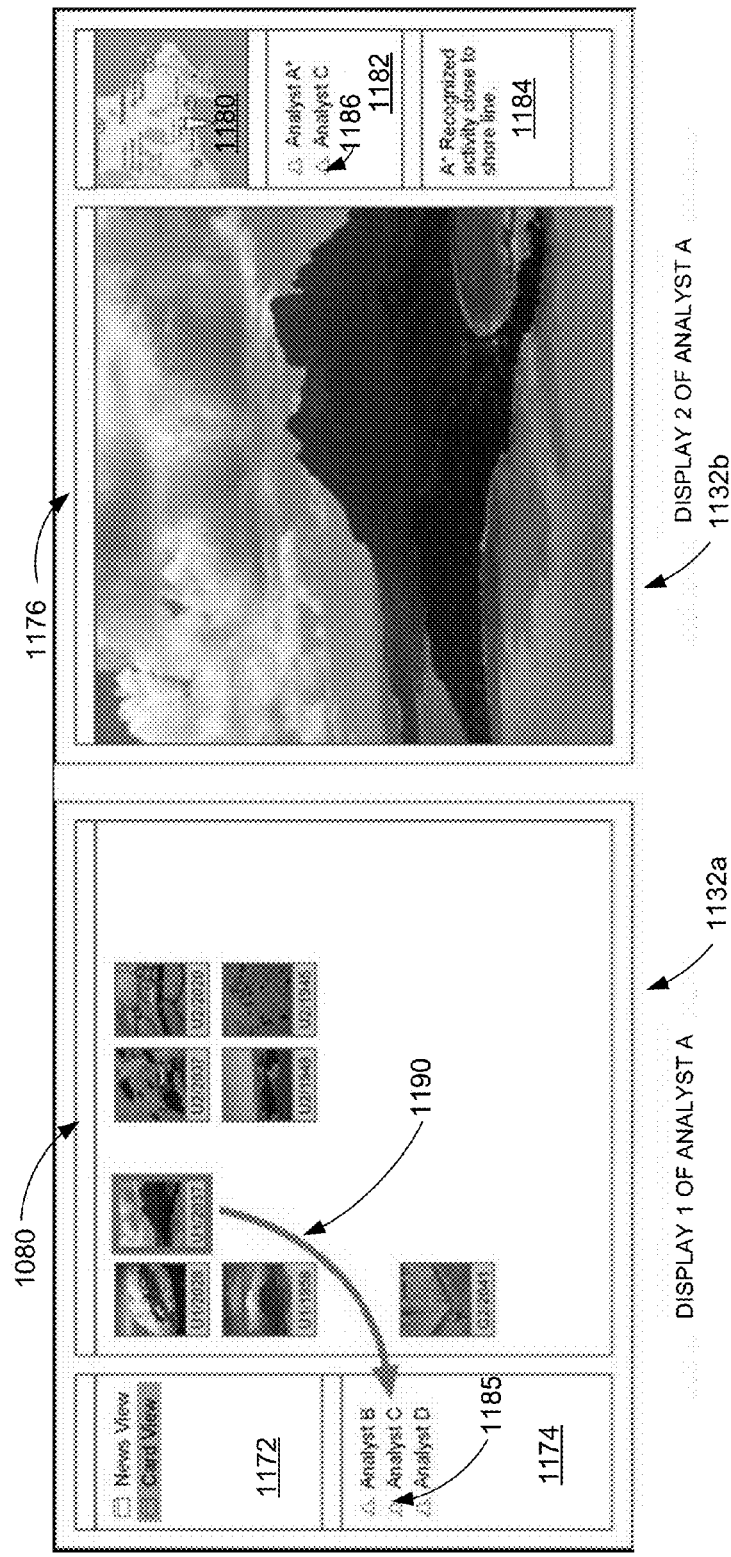
Figure 13C:
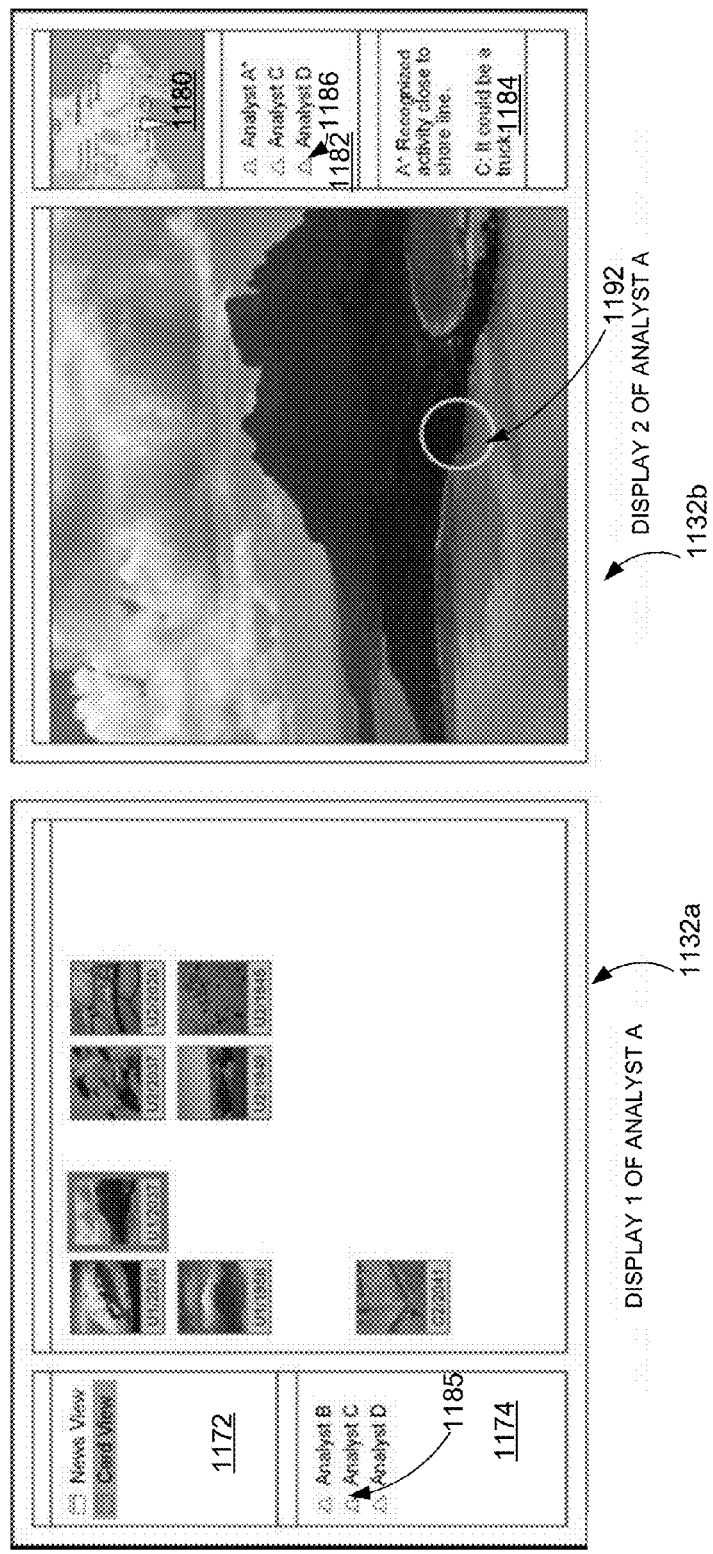

FIGS. 13A-13C show an exemplary scenario that illustrates some of the previously described object features. The scenario includes the contents and activities on two computer displays of one analyst. The left display 1132a includes a View Manager 1172, an IM system panel 1174 and a News View 1080. The right display 1132b includes a Multimedia panel 1176, a Map panel 1180 a Participants panel 1182, and a Conversations Panel 1184. The task of the analyst is to monitor and review video clips collected by two UAV operators and two security cameras.

Referring again to FIG. 13A, the analyst selects different objects in the News View to review still pictures and video-clips in the Multimedia panel as well as to investigate the geographic locations associated with particular video-clips in the Map panel. The analyst moves objects that require further investigation to his/her Card View in the View Manager 1172 as indicated by arrow 1170.

FIG. 13B shows the analyst distributing objects (as indicated by arrow 1190) that require a more detailed investigation in collaboration with other analysts. Here, the analyst drags an object to Analyst C 1185 in the IM system panel 1174 and an Analyst C indication 1186 is displayed in the Participants panel 1182. The Participants panel 1182 allows the analyst to see if the objects have been received and accepted by the recipients. The analyst then initiates discussions about particular objects through the Conversations panel 1184.

Finally, in FIG. 13C, the analyst uses the object's drawing tools 1192 to highlight particular sections of still pictures for other analysts to see and discuss. The analyst also reviews and responds to the messages exchanged through the Conversations panel 1184. Furthermore, the analyst monitors the Participants panel 1182 to see if particular objects were distributed to additional analysts. Using the Participants panel 1182, an analyst can form a group from the plurality of participants and any participant can share the object with an additional participant to add the additional participant to the group. For example, Analyst A sends Card 1 to Analyst C and now both, analyst A and C have a copy of Card 1. Analysts A and C can modify Card 1 and can communicate through Card 1, for example, by exchanging file related to Card 1 Next, Analyst C sends Card 1 to Analyst D and now analysts A, C and D can modify and communicate through Card 1 to join the discussion.

Figure 14:
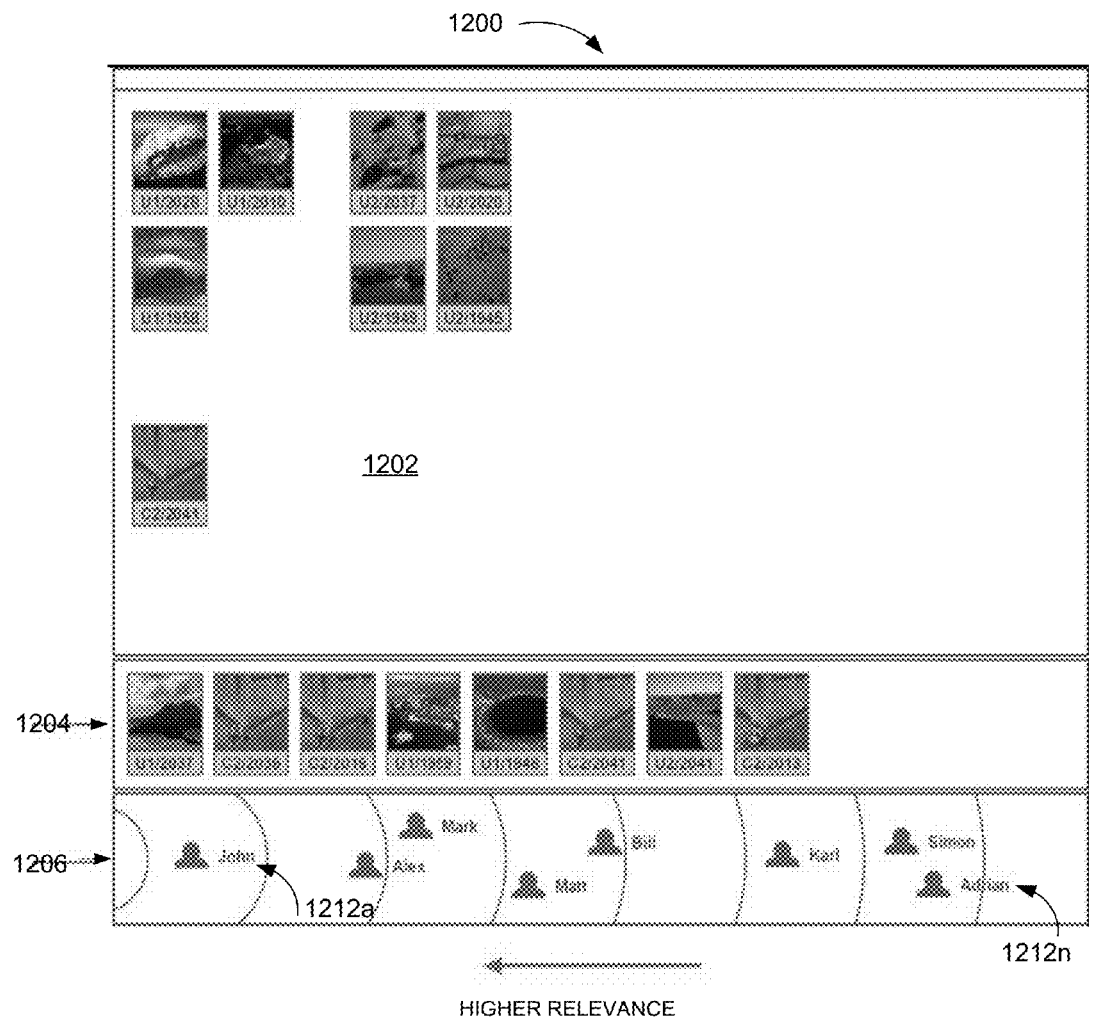
FIG. 14 is a diagram of a discovery display in a GUI to present analysts with potentially relevant information or people with relevant expertise in accordance with one example embodiment disclosed herein.

Now referring to FIG. 14, an exemplary Discovery Display 1200 presents analysts with potentially relevant information or people with relevant expertise based on the information displayed on the analyst's spatial and temporal views of information. For example, an analyst collects a few Cards in view 1202 that represent video clips from UAVs and security cameras. The Discovery Display 1200 might propose a few additional Cards in row 1204 that show video clips taken in similar geographic areas or that other analysts determined to be of relevance. The Discovery Display 1200 might also list people 1212a-1212n in row 1206 who previously reviewed the same or similar video clips or that worked with information associated with the same or similar geographic locations. The Discovery Display 1200 lists information and people in the order of priority from left to right. The goal of the Discovery Display 1200 is to help analysts detect relevant information and people in subtle and non-destructive ways. The analysts can choose to completely ignore (i.e., close) the Discovery Display 1200, occasionally review proposed information within the visible Discovery View 1200 display area rows 1204 and 1206, or use a Discovery Display 1200 scroll bar (not shown) to explore a broader range of suggestions. Generally, in a visible view (which can be shared among analysts), invited collaborators can see, copy from, but not modify the view.

Figure 15:
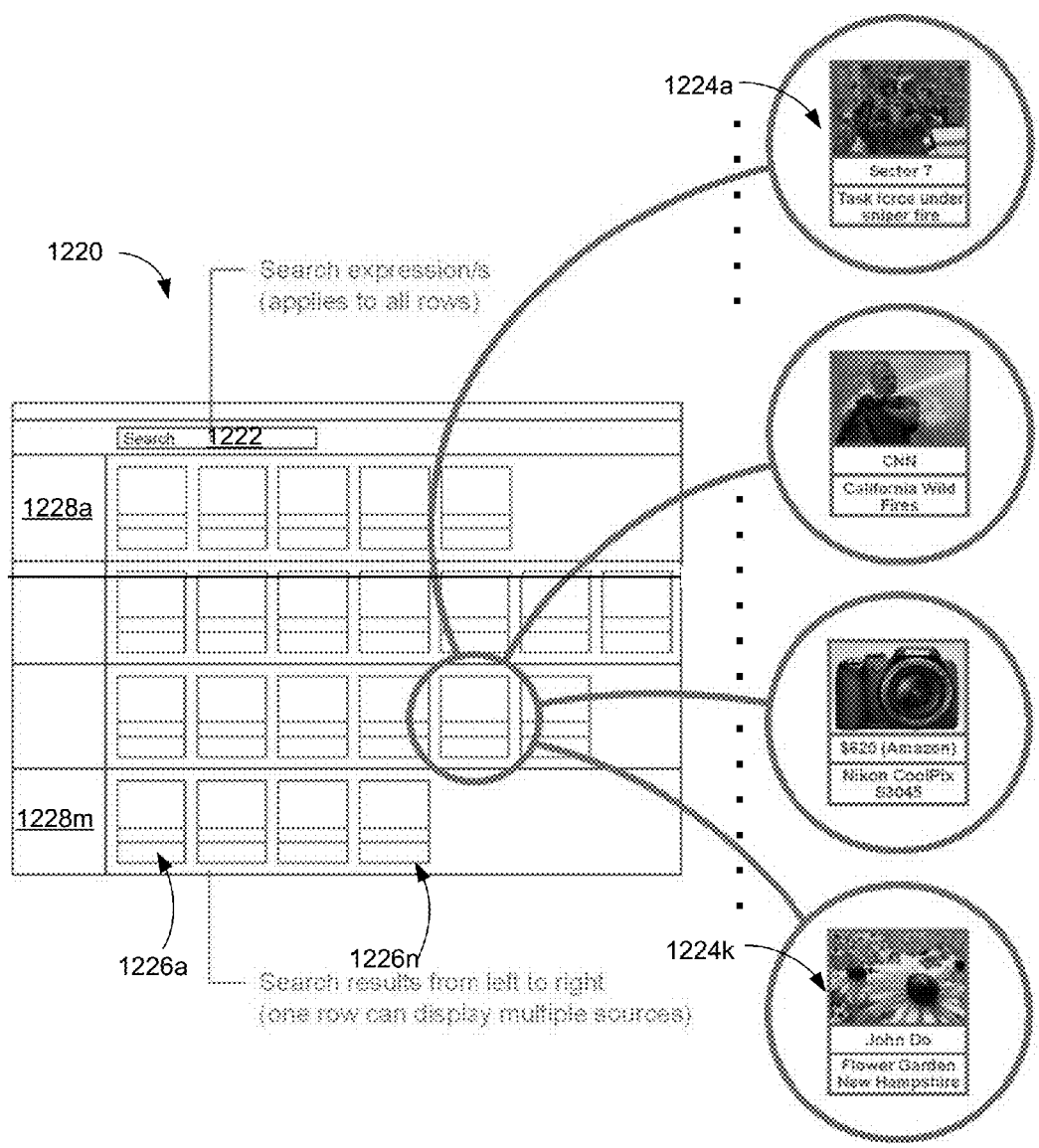
FIG. 15 is a diagram of a Search View to provide Object searching and result display by source and relevance in accordance with one example embodiment disclosed herein.

Now referring to FIG. 15, an exemplary Search View 1220 provides users with the means to search multiple sources simultaneously and view the results 1224a-1224k in Card format organized by source (vertical) rows 1228a-1228m and relevance (horizontal) columns 1226a-1226n. The Search View 1220 look and feel is designed to match the News View interface. Intelligence analysts may use the Search View 1220 to display intelligence information (such as UAV video clips) from multiple databases (or the interfaces of other analysts). Consumers and professionals may use the Search View 1220 to search for newspaper articles, pictures, videos, sales items and other information. Items of interest can be collected on the Card View, and also shared, rated and discussed with other users.

Figure 16:
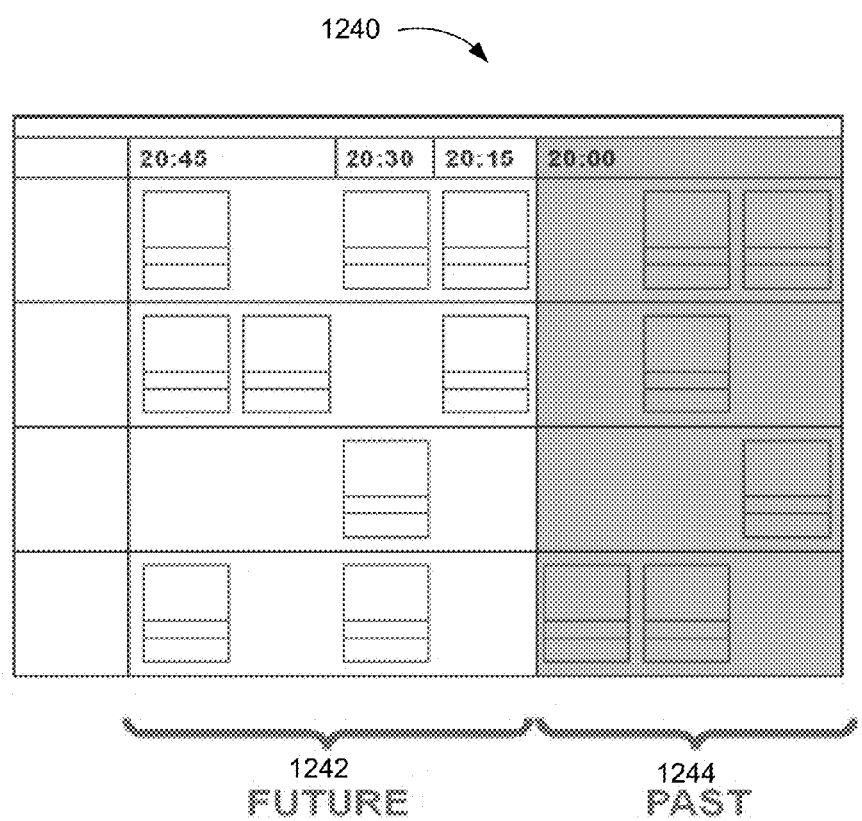
FIG. 16 is a diagram of a News View including future and past Object sources in accordance with one example embodiment disclosed herein.

Now referring to FIG. 16, a News View 1240 in addition to facilitating visualization of information associated with a time in the past (past events 1244) can also be useful to visualize future events 1242 which will be used to provide information objects. In one embodiment, News view 1240 uses a different background color to separate between times in the future and in the past. Examples of sources of future events include but are not limited to RSS feeds, Outlook Calendar events, Theater Events Trade Shows Conferences Webcasts and other Social Events. These future events facilitate the creation of additional Cards. Apart from the future and past separation the News View looks and functions similarly to a regular News View.

Figure 17:
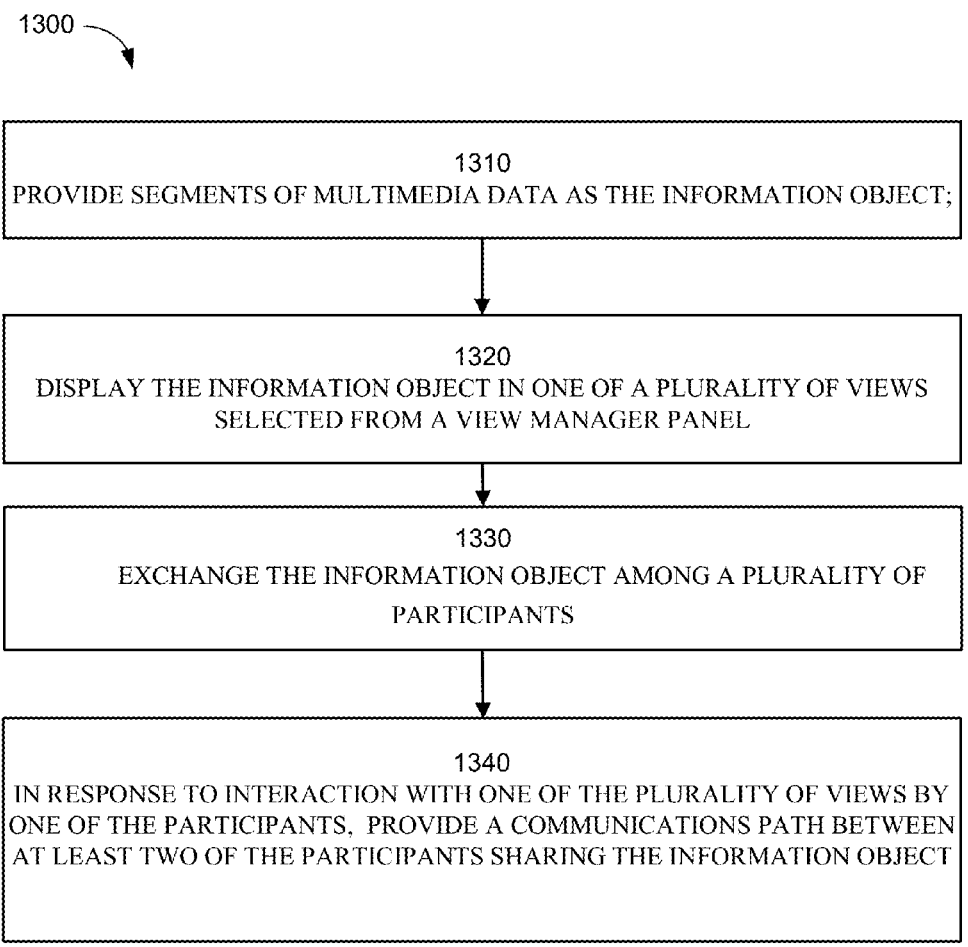
FIGS. 17-19 are flow charts of processing steps performed to provide, display and exchange multimedia objects in accordance with embodiments disclosed herein.

FIG. 17 diagrams the overall process of creating, sharing, displaying and interacting with an information object. In step 1310, segments of multimedia data are provided as an information object. Next, in step 1320, the information object in one of a plurality of views selected from a view manager panel is displayed. In step 1330, the information object among a plurality of participants is exchanged. Finally in step 1340, in response to interaction with the information object in one of the plurality of views by one of the participants, a communications path is provided between at least two of the plurality of participants sharing the information object.

Figure 18:
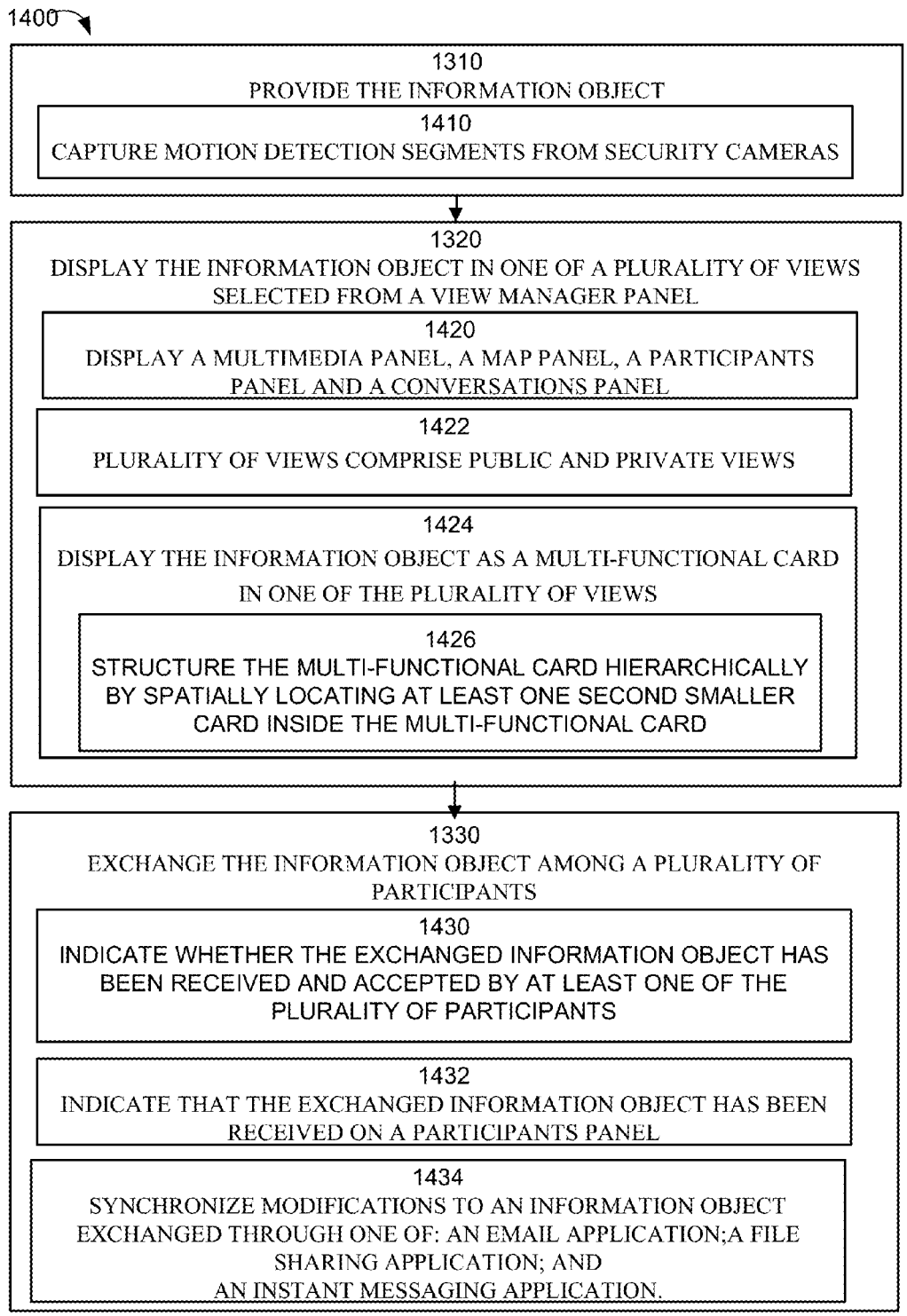

FIG. 18 is a flow chart 1400 of processing steps showing additional details in conjunction with flow chart 1300 FIG. 17. In one embodiment, step 1410 provides the information object by capturing motion detection segments from security cameras. In step 1420 a Multimedia panel, a Map panel, a Participants panel and a Conversations panel are displayed. In step 1422, the plurality of views include public and private views. In step 1424, the information object is displayed as a multi-functional card in one of the plurality of views. In step 1426, the multi-functional card is structured hierarchically by spatially locating at least one second smaller card inside the multi-functional card.

In step 1430, the interface display includes an indication whether the exchanged information object has been received and accepted by at least one of the plurality of participants. In step 1432, an indication that the exchanged information object has been received is displayed on a Participants panel. In step 1434, exchanging the information object among a plurality of participants further includes synchronizing modifications to an information object exchanged through one of: an email application; a file sharing application; and an instant messaging application.

Figure 19:
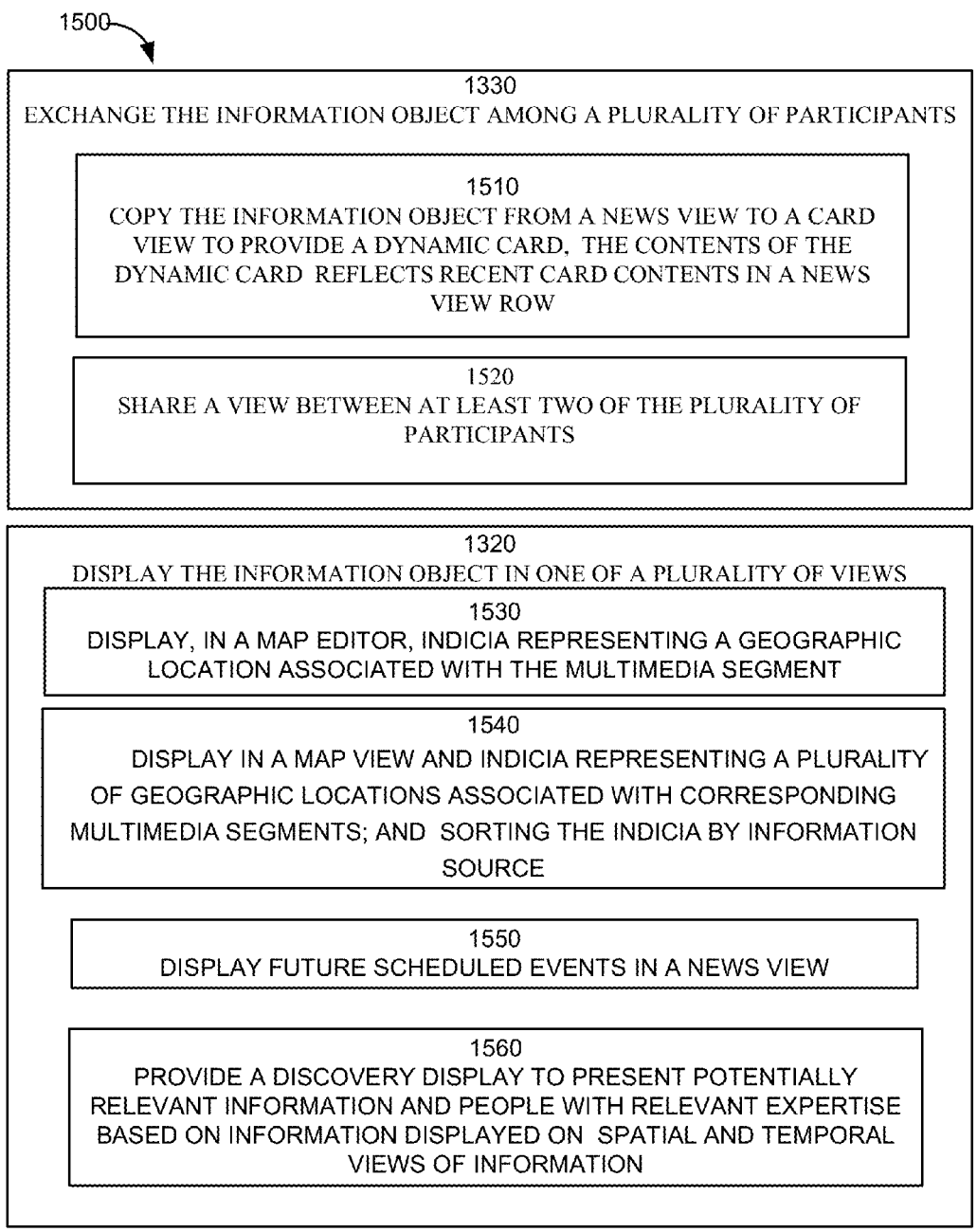

FIG. 19 is a flow chart 1500 showing additional interface operations related to copying, sharing and displaying objects. In step 1510, the information object is copied from a News view to a card view to provide a dynamic card and the contents of the dynamic card reflect recent card contents in a News view row. In step 1520, a view is shared between at least two of the plurality of participants.

In step 1530, in a Map Editor, indicia representing a geographic location associated with the multimedia segment are displayed. In step 1540, in a Map View and indicia representing a plurality of geographic locations associated with corresponding multimedia segments is displayed and the indicia is sorted by information source. In step 1550, future scheduled events are displayed in a News view. In step 1560, a Discovery Display is provided to present potentially relevant information and people with relevant expertise based on information displayed on spatial and temporal views of information.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A computer-implemented method of remotely analyzing information represented by an information object, in which at least one computer initiates execution of software instructions to perform steps of:
   providing segments of multimedia data as the information object;
   displaying the information object in one of a plurality of views selected from a view manager panel;
   exchanging the information object among a plurality of participants;
   in response to interaction with the information object in at least one of the plurality of views by one of the plurality of participants, providing a communications path between at least two of the plurality of participants sharing the information object;
   wherein displaying the information object in the at least one of the plurality of views further comprises displaying the information object as a multi-functional card in the at least one of the plurality of views; and
   wherein the plurality of views includes a news view and one of:
   a workspace view; and
   a map view;
   wherein the workspace view includes a spatial arrangement of a plurality of information objects;
   wherein at least one of the plurality of information objects can be viewed by the plurality of participants having one of:
   an appropriate access permission;
   an appropriate security level; and
   wherein the at least one of the plurality of information objects can be copied between two different ones of the plurality of views.

2. The method of claim 1, wherein exchanging the information object among the plurality of participants includes indicating whether the exchanged information object has been received and accepted by at least one of the plurality of participants.

3. The method of claim 2, further comprising indicating that the exchanged information object has been received on a Participants panel.

4. The method of claim 1, wherein exchanging the information object among the plurality of participants further includes synchronizing modifications to the information object exchanged through one of:
   an email application;
   a file sharing application; and
   an instant messaging application.

5. The method of claim 1, wherein displaying the information object further comprises displaying a Multimedia panel, a Map panel, a Participants panel and a Conversations panel.

6. The method of claim 1 further comprising structuring the multi-functional card hierarchically by spatially locating at least one second card inside the multi-functional card.

7. The method of claim 1 further comprising copying the information object from the news view to the workspace view to provide a dynamic card, wherein content of the dynamic card reflects recent card content in a news view row.

8. The method of claim 1, wherein of the plurality of views comprise public and private views.

9. The method of claim 1, further comprising sharing one of the plurality of views between at least two of the plurality of participants.

10. The method of claim 1, wherein providing segments of multimedia data as the information object comprises one of:
   capturing manually created video clip segments; and
   capturing automatic motion detection segments from security cameras.

11. The method of claim 1, further comprising moving the information object from one of the plurality of views to the workspace view in a view manager.

12. The method of claim 1, further comprising forming a group from the plurality of participants and wherein any participant can share the object with an additional participant thereby including the additional participant within the group.

13. The method of claim 1, wherein the information object comprises a video clip;
   the method further comprising assigning a start time and an end time such that the video clip is displayed as a snippet having a shorter duration that the video clip; and
   wherein the start time and end time of the video clip is modified by at least one of:
   one of the plurality of participants creating the object; and a different one of the plurality of participants sharing the object.

14. The method of claim 1 further comprising:
recording the authorship history of the information object; and
perpetuating the history in a duplicated information object.

15. The method of claim 1, wherein providing segments of multimedia data as the information object further comprises providing a graphical user interface to capture a video clip as the information object in response to one of the plurality participants dragging and dropping a reference to a video from a web-site onto one of the plurality of views.

16. The method of claim 1, wherein the information object comprises a video clip; and
the method further comprises assigning a start time and an end time via controls provided to one of the plurality of participants such that the video clip is displayed as a snippet having a shorter duration that the video clip.

17. The method of claim 1, further comprising identifying additional ones of the plurality of information objects based on the spatial arrangement of the information object relative to other different information objects of the plurality of information objects in the workspace view.

18. A computer-readable non-transitory storage medium having instructions stored thereon for processing data information, such that the instructions, when carried out by a processing device, enable the processing device to perform operations of:
providing a graphical interface for displaying an information object comprising:
a Participants panel for displaying a list of a plurality of participants linked to the information object and for exchanging the information object among the list of participants; and
a Multimedia panel for displaying segments of multimedia data as the information object;
displaying the information object as a multi-functional card in at least one of a plurality of views; and
wherein the plurality of views includes a news view and one of:
a workspace view; and
a map view;
wherein the workspace view includes a spatial arrangement of a plurality of information objects;
wherein at least one of the plurality of information objects can be viewed by the plurality of participants having one of:
an appropriate access permission;
an appropriate security level; and
wherein the at least one of the plurality of information objects can be copied between two different ones of the plurality of views.

19. A system for sharing information objects among a group of participants comprising:
a processor;
a memory unit that stores instructions associated with an application executed by the processor; and
an interconnect coupling the processor and the memory unit, enabling a computer system to execute the application and perform operations of:
providing segments of multimedia data as an information object;
displaying the information object in at least one of a plurality of views;
exchanging the information object among a plurality of participants; and
in response to interaction with the information object in one of the plurality of views by one of the participants, providing a communications path between at least two of the plurality of participants sharing the information object;
wherein displaying the information object in the at least one of the plurality of views further comprises displaying the information object as a multi-functional card in one of the plurality of views; and
wherein the plurality of views includes a news view and one of:
a workspace view; and
a map view;
wherein the workspace view includes a spatial arrangement of a plurality of information objects;
wherein at least one of the plurality of information objects can be viewed by the group of participants having one of:
an appropriate access permission;
an appropriate security level; and
wherein the at least one of the plurality of information objects can be copied between two different ones of the plurality of views.

20. A computer-readable non-transitory storage medium having instructions stored thereon for processing data information, such that the instructions, when carried out by a processing device, enable the processing device to perform operations of:
providing segments of multimedia data as an information object;
displaying the information object in at least one of a plurality of views selected from a view manager panel;
exchanging the information object among a plurality of participants; and
in response to interaction with the information object in the at least one of the plurality of views by one of the participants, providing a communications path between at least two of the plurality of participants sharing the information object;
displaying the information object as a multi-functional card in the at least one of the plurality of views; and
wherein the plurality of views includes a news view and one of:
a workspace view; and
a map view;
wherein the workspace view includes a spatial arrangement of a plurality of information objects;
wherein at least one of the plurality of information objects can be viewed by the plurality of participants having one of:
an appropriate access permission;
an appropriate security level; and
wherein the at least one of the plurality of information object can be copied between two different ones of the plurality of views.

* * * * *